(12) United States Patent
Jessie, Jr.

(10) Patent No.: US 8,262,114 B2
(45) Date of Patent: Sep. 11, 2012

(54) CHILD VEHICLE HAVING A TOOL-LESS COUPLING AND ASSOCIATED METHOD

(75) Inventor: Donald K. Jessie, Jr., Middletown, OH (US)

(73) Assignee: Huffy Corporation, Centerville, OH (US)

( * ) Notice: Subject to any disclaimer, the term of this patent is extended or adjusted under 35 U.S.C. 154(b) by 170 days.

(21) Appl. No.: 12/706,578

(22) Filed: Feb. 16, 2010

(65) Prior Publication Data

US 2011/0198822 A1 Aug. 18, 2011

(51) Int. Cl.
*B62K 21/00* (2006.01)
*B62J 1/08* (2006.01)

(52) U.S. Cl. ...... 280/279; 280/274; 280/220; 280/87.01; 280/87.041; 280/87.05; 280/62; 280/287; 280/278; 297/215.13; 297/215.14; 297/215.15; 74/551.1; 74/551.2; 74/551.3; 74/551.4; 74/551.5; 74/551.6; 74/551.7; 74/551.8

(58) Field of Classification Search ............ 280/279, 280/274, 220, 87.01, 87.041, 87.05, 62, 282, 280/278, 287; 297/215.13, 215.14, 215.15
See application file for complete search history.

(56) References Cited

U.S. PATENT DOCUMENTS

| | | | |
|---|---|---|---|
| 1,379,305 A | 5/1921 | Johns | |
| 1,514,720 A * | 11/1924 | Pauly | 280/259 |
| 1,653,583 A | 12/1927 | Paxson | |
| 2,481,837 A | 9/1949 | Giese | |
| D158,455 S | 5/1950 | Glamb | |
| D176,037 S | 11/1955 | Rhoades | |
| 4,079,957 A | 3/1978 | Blease | |
| 4,657,270 A | 4/1987 | Allen et al. | |
| 4,958,842 A | 9/1990 | Chang | |
| D355,870 S | 2/1995 | Dieudonne | |
| 5,441,289 A | 8/1995 | Spielberger | |

(Continued)

FOREIGN PATENT DOCUMENTS

GB 2 263 258 7/1993

(Continued)

OTHER PUBLICATIONS

Mark A. Laipple; Declaration of Mark A. Laipple; Aug. 13, 2010; 3 pages.

*Primary Examiner* — Joanne Silbermann
*Assistant Examiner* — Marlon Arce
(74) *Attorney, Agent, or Firm* — Wood, Herron & Evans, LLP

(57) ABSTRACT

A tool-less coupling of a child vehicle having a front frame and a rear frame includes a post coupled to one of the front or rear frames; a locking insert having at least one flexible table coupled to the post, and a head tube coupled to the other of the front or rear frame, wherein an opening in a first end of the head tube is sized to cause inward flexing of the flexible tab as the post is inserted through the head tube, and the flexible tab flexes back outwardly after passing through the opening in the head tube so that a portion of the flexible tab is adjacent an end surface of the head tube such that the flexible tab cannot move back through the opening. Accordingly, the removal of the post from the head tube is prohibited and the front and rear frames are coupled together. A method for a tool-less assembly of a child vehicle is also disclosed.

19 Claims, 13 Drawing Sheets

U.S. PATENT DOCUMENTS

| | | |
|---|---|---|
| 6,685,206 B1 | 2/2004 | Blake |
| 6,685,207 B1 | 2/2004 | Blake |
| 6,695,327 B1 | 2/2004 | Maggiore et al. |
| D494,509 S | 8/2004 | Chiappetta et al. |
| D518,417 S | 4/2006 | Oosterveer |
| D525,568 S | 7/2006 | Baron |
| 7,188,849 B2 | 3/2007 | Lee |
| 7,226,065 B2 * | 6/2007 | Hutson ............... 280/226.1 |
| 7,455,308 B2 | 11/2008 | Michelau et al. |
| 7,487,982 B2 | 2/2009 | Chan |
| D589,851 S | 4/2009 | Jane Santamaria |
| D594,788 S | 6/2009 | Hartlaub et al. |
| D630,158 S * | 1/2011 | Jessie, Jr. ............... D12/423 |
| 2001/0035626 A1 * | 11/2001 | Kettler ............... 280/282 |
| 2003/0052471 A1 | 3/2003 | Grafton |
| 2004/0061304 A1 * | 4/2004 | Lim ............... 280/278 |
| 2006/0186641 A1 * | 8/2006 | Chan ............... 280/638 |
| 2008/0179850 A1 | 7/2008 | Catelli |
| 2010/0289244 A1 * | 11/2010 | Grossman ............... 280/210 |

FOREIGN PATENT DOCUMENTS

| | | |
|---|---|---|
| JP | 2000142526 | 5/2000 |

* cited by examiner

CHILD VEHICLE HAVING A TOOL-LESS COUPLING AND ASSOCIATED METHOD

TECHNICAL FIELD

The invention relates generally to a child vehicle, and more particularly to a child vehicle capable of converting between two configurations. The invention also relates to personalizing the child vehicle and providing additional activities for a child using the vehicle.

BACKGROUND

Trikes and scooters are among some of the most popular of today's outdoor toys for young children. Previously, if a child desired both a trike and a scooter, the child's parents or guardian would typically purchase two separate products. However, the purchase of two separate products may be costly. Additionally, two separate products increase the space required for storage, which may be at a premium in a garage, basement or other storage location. Accordingly, manufacturers of these types of child vehicles have made attempts to develop a convertible vehicle that easily transitions between a trike configuration and a scooter configuration. Such attempts, however, have been problematic and therefore have met with limited commercial success in the marketplace.

In this regard, there are a number of design considerations that may not be easily addressed to achieve convertibility between a trike and a scooter. By way of example, conventional trikes have seat assemblies on which to support a rider, while scooters lack such a seat assembly. Indeed, the presence of a seat assembly on a scooter may destroy the intended operation of the scooter, or at a minimum, would most likely diminish the enjoyment experienced by a child using the scooter. Moreover, scooters typically include a deck for supporting one or more feet of the rider thereon. Trikes, on the other hand, typically lack such a deck, as the feet of the rider are intended to be placed on the pedals of the trike. Thus, meshing the design of a trike and a scooter can present design challenges that have not been adequately addressed in the industry.

Additionally, many trikes and scooters are manufactured and shipped to various retail outlets in an unassembled state. Some retail outlets may offer a service of assembling the vehicles for the customer. However, in many instances, such a service may not be offered or the consumer chooses to forego the service and assemble the vehicle at home. In any event, conventional assembly of the vehicle typically requires the retail outlet or the consumer to have various tools for implementing assembly. When assembly is performed at the retail outlet, such tool-based assembly can be costly and time consuming. Moreover, improper assembly by the retail outlet can be a source of consumer frustration and/or product return. When assembly is performed by the consumer in the home setting, for example, tool-based assembly can be the source of consumer frustration, and may likewise result in product return if the assembly process becomes too complex or daunting.

Furthermore, there is a strong desire in children to customize their possessions in an effort to express individuality and personality. Conventional trikes, scooters and other child vehicles do not offer much potential for customization and design beyond those incorporated at the factory level. In this regard, trikes, scooters and other child vehicles are typically offered at retail outlets with predetermined color schemes or decorative features (e.g., decals, etc.), which oftentimes fail to make a personal connection with the child or provide the opportunity to personalize the vehicle. Additionally, many of the products currently on the market lack new and exciting features that allow children to play in different and interesting ways. In this regard, many products offered today provide limited activities for children, often being limited to a single activity (e.g., a tricycle is only used to ride). This may in turn limit the use of or diminish the enjoyment the child may gain from using the product.

Thus, while conventional trikes and scooters are generally successful for their intended purpose, there remains a need for a child vehicle that can convert between multiple configurations in an improved and appealing manner. There also remains a need for a vehicle that may be assembled in a tool-less manner. Additionally, there remains a need for a child vehicle that allows children to assert their individuality by personalizing their vehicles through, for example, artistic expression. There also remains the need to provide additional activities for a child to enjoy using the vehicle.

SUMMARY

In one illustrative embodiment, the present invention is drawn to a vehicle for a child having a front frame including a handlebar and at least one front wheel and a rear frame movably coupled thereto and including at least one rear wheel. At least one graphical interface is coupled to the vehicle that includes a placard having a frame secured to the vehicle and a working surface disposed generally within the frame. The working surface is configured to be marked thereon by the child using a marking utensil so as to create an artistic expression for customizing the vehicle. The graphical interface may be included on a broad range of child vehicles including bicycles, tricycles, scooters and ride-on vehicles.

In one embodiment, the working surface may be defined by the surface of an art board. Generally, the working surface may include a surface roughness sufficient to allow a marking utensil to mark on therenon when in movable contact therewith. The working surface may also be configured to allow markings to be erased or otherwise relatively easily removed therefrom. In one embodiment, the working surface may be integrally formed with the frame such that the placard is a one-piece construction. Alternatively, however, in another embodiment, the placard may include a substrate removably coupled to the frame, wherein the substrate defines the working surface. For example, the substrate may include an art board removably coupled with the frame or a member having a sufficient surface roughness for receiving markings thereon. The substrate may also include a wide range of paper products, including various specialty paper configured for drawing, painting, coloring, etc. In one exemplary embodiment, the placard may include a slider removably coupled to the frame having a handle and a depending member that defines the working surface thereon.

In one particular embodiment, the graphical interface may be incorporated with a child vehicle capable of converting between two configurations. In this regard, the vehicle may include a deck coupled to the rear frame and a seat assembly configured to be removably coupled to the rear frame. When the seat assembly is coupled to the vehicle, the vehicle may have a tricycle configuration. And when the seat assembly is not coupled to the vehicle, the vehicle may have a scooter configuration. More particularly, the scooter may be configured as a chariot scooter.

In a further aspect of the invention, the deck may define a deck plane and the seat assembly may couple to the rear frame at a location below the deck plane. In this way, the deck is uninterrupted by the seat assembly and any of the support structure for coupling the seat assembly to the vehicle does not affect operation of the vehicle as a scooter. In one particular embodiment, the rear frame may include a support post that extends in a direction that is generally parallel to the deck place. The seat assembly may include a bracket having a leg also extending in a direction generally parallel to the deck plane. The leg engages with the support post to couple the seat assembly to the vehicle.

In another embodiment in accordance with aspects of the invention, a tool-less coupling of a child vehicle is disclosed. The child vehicle includes a front frame and a rear frame that are movably coupled together during assembly. The coupling includes a post coupled to one of the front frame and rear frame having an outer surface and a free end. A locking insert having at least one flexible tab is coupled to the free end of the post such that at least a portion of the at least one tab extends outwardly of the outer surface of the post. The tab is capable of flexing generally inwardly toward the outer surface of the post. The coupling further includes a head tube coupled to the other of the front frame or rear frame. The head tube includes a passageway configured to receive the post therein and a first end having an opening in communication with the passageway and an end surface disposed about the opening. The opening in the first end is sized to cause inward flexing of the at least one flexible tab as the post is being inserted through the passageway. However, the flexible tab flexes back outwardly after having passed through the opening in the first end. In this way, a portion of the flexible tab is adjacent the end surface and outward of the opening such that the locking tab cannot move back through the opening and removal of the post from the head tube is prohibited.

In one particular embodiment, the post includes a passageway therethrough and at least one slot formed through the outer surface so as to be in communication with the passageway. At least a portion of the locking insert is positioned in the passageway when coupled to the post and the at least one tab projects through the at least one slot in the post. The coupling may further include a protective cap to cover the locking insert. The protective cap may be configured to lock to the locking insert.

In still a further embodiment, a tool-less assembly method for coupling a front frame and a rear frame of a child vehicle is disclosed, the front and rear frames define a coupling as described above and the method includes inserting the post into the passageway of the head tube; flexing the at least one flexible tab as the locking insert passes through the first end of the head tube; and positioning the flexible tab adjacent the end surface of the first end and outwardly of the opening therein so as to prohibit the locking insert from passing back through the opening in the first end.

DETAILED DESCRIPTION

Figure 1:
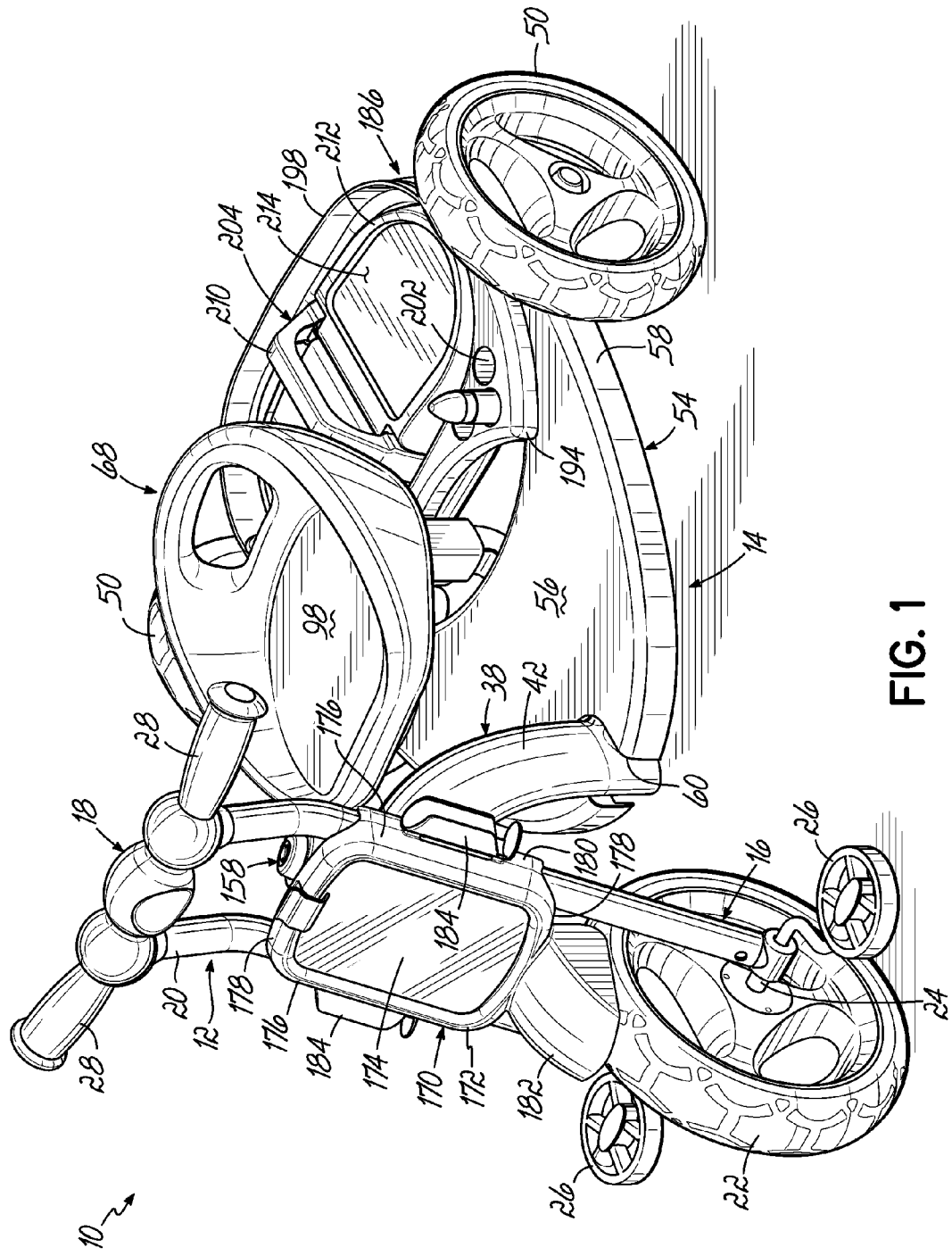
FIG. 1 is a front perspective view of one illustrative embodiment of a convertible child vehicle having a graphical interface in the form of a tricycle.
Figure 2:
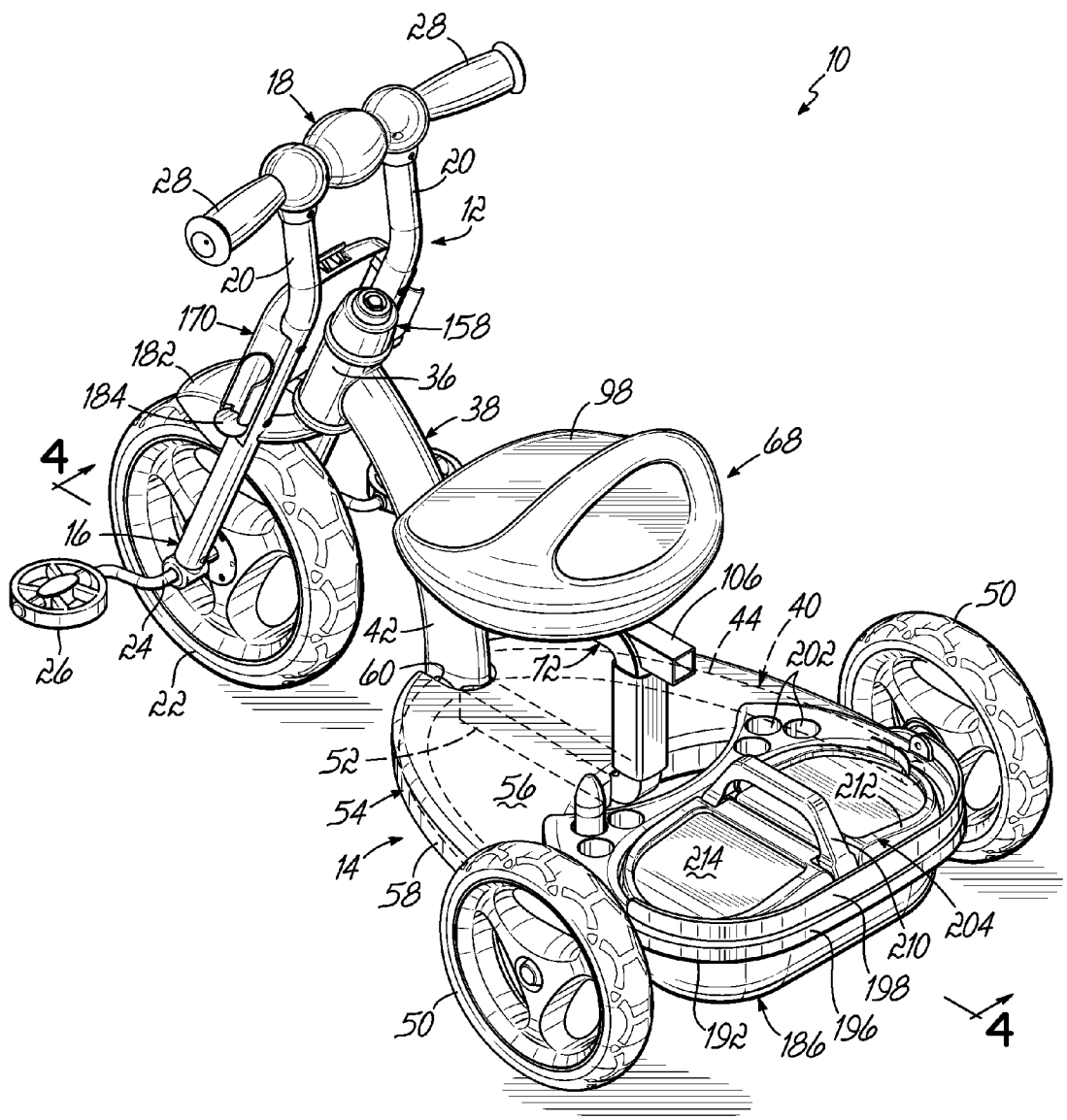
FIG. 2 is a rear perspective view of the child vehicle of FIG. 1.

Referring now to the drawings and to FIGS. 1 and 2 in particular, a convertible child vehicle 10 in accordance with an exemplary embodiment of the invention, shown in the form of a tricycle, includes a front frame 12 pivotally coupled to a rear frame 14. The front frame 12 includes a front fork 16 operatively coupled to a handlebar 18. The front fork 16 includes a pair of spaced apart legs 20 that extend in a generally parallel fashion. A front wheel 22, which defines a front axle 24, is positioned between the legs 20 and rotatably coupled thereto so as to allow rotation of the front wheel 22 relative to the front frame 12. A pair of pedals 26 are positioned outboard of the legs 20 of front fork 16 and are operatively coupled to the front wheel 22 (e.g., such as by being coupled to the front axle 24) for allowing a rider (not shown) to rotate the front wheel 22, and consequently, propel the vehicle 10 in a certain direction dictated by the handlebar 18.

In this embodiment, the legs 20 of the front fork 16 do not converge to a single fork stem, as is conventional, but instead extend substantially the full length of the front fork 16. In this regard, the handlebar 18 may couple to an upper end of the generally parallel legs 20. For example, the handlebar 18 may be coupled to the legs 20 using a screw or other suitable fastener. As shown in FIG. 1, in one embodiment, the legs 20 may be angled adjacent the handlebar 18, so as to, for example, project away from the rider. In alternative embodiments, such an angle need not be formed and the forks may be generally straight or have some other configuration. The handlebar 18 may include a pair of handles 28 configured to be grasped by the rider for turning the vehicle 10 in a desired direction. Those of ordinary skill in the art will recognize that the handlebar 18 may have a wide variety of shapes and designs and the invention is not limited to the particular embodiment shown herein.

Figure 5:
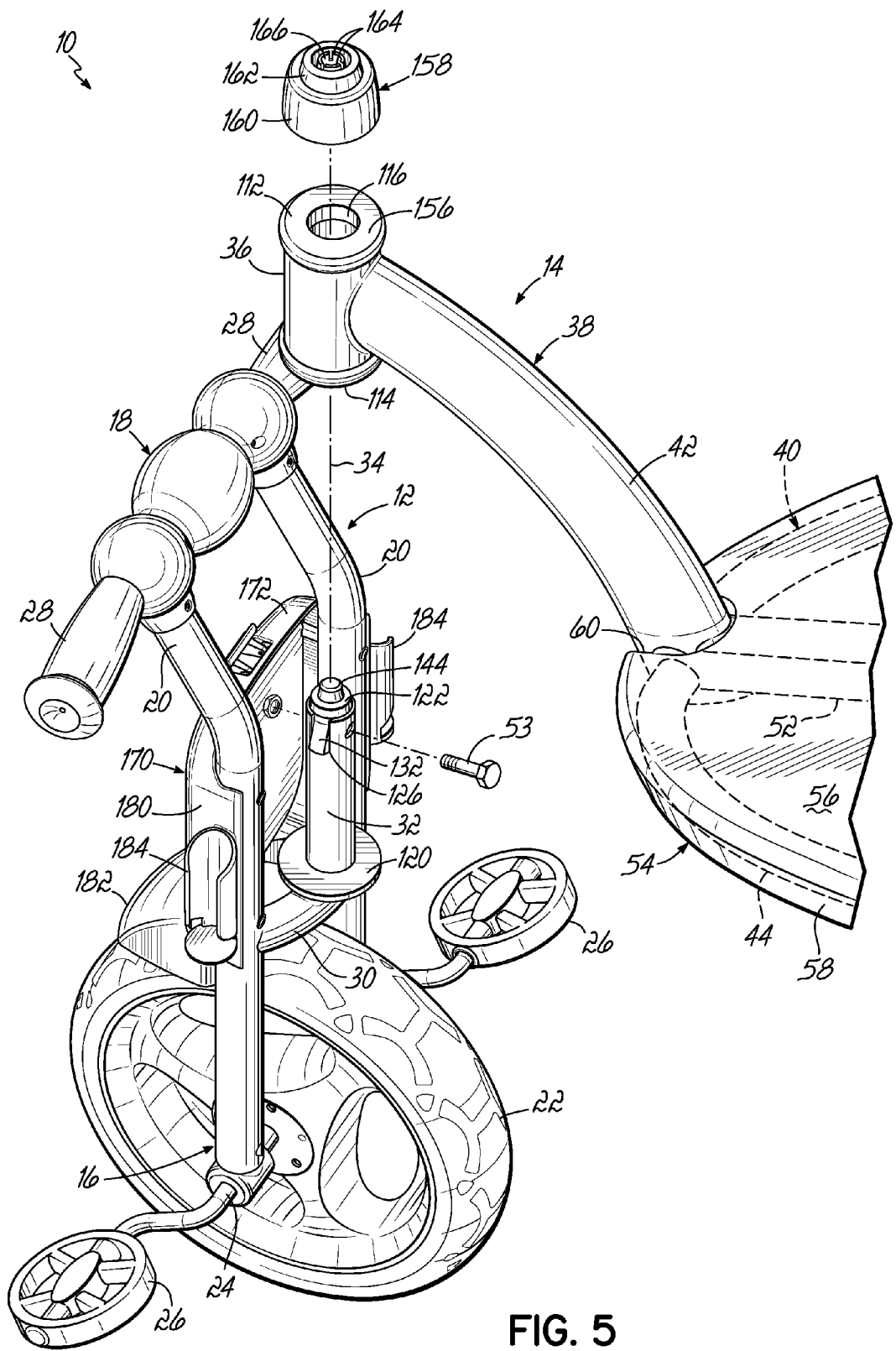
FIG. 5 is a disassembled perspective view of a tool-less coupling between a front and rear frames of the vehicle.

As mentioned above, the front frame 12 is pivotally coupled to the rear frame 14. To this end, the front frame 12 includes an attachment member having a crossbar 30 extending between the legs 20, and a post 32 (FIG. 5) coupled to the crossbar 30 and extending in a direction generally parallel to the legs 20. In one embodiment, the crossbar 30 may have an orthogonal relationship with the legs 20. However, the crossbar 30 may be generally arcuate such that the post 32, which may be centrally located on the crossbar 30, may be offset from the legs 20 so as to be spaced from a plane or axis generally defined by the legs 20. As explained in more detail below, the post 32 (FIG. 5) is configured to receive a portion of the rear frame 14 thereon to effectuate the pivotal coupling between the front and rear frames 12, 14. In this regard, the post 32 defines a pivot axis 34 that, in one embodiment, may be generally parallel to, but spaced from, a plane or axis 35 defined by legs 20 (FIG. 5).

The elements that form the front frame 12 may be formed from a variety of materials. For example, the legs 20, crossbar 30, and post 32 may be formed from metal (e.g., metal tubing) and have a circular, oval, or other suitable cross-sectional shape. These materials and shapes are merely exemplary and it should be recognized that other materials and shapes may be used. In contrast, the handlebar 18 and the pedals 26 may be formed from suitable engineering plastics, including for example, polypropylene, polyethylene or other suitable plastics. However, the invention is not so limited as the handlebar 18 and/or pedals 26 may be formed from other suitable materials.

The rear frame 14 includes a head tube 36 configured to be pivotally coupled to the front frame 12, a first support element 38 coupled to the head tube 36 at one end thereof, and a second support element 40 (shown in phantom in FIG. 2) coupled to the other end of the first support element 38. In one embodiment, the first support element 38 may include a generally arcuate tubular member 42 having a relatively large oval cross-sectional shape, though circular or other cross-sectional shapes may also be used. Additionally, the first support element 38 may include multiple tubes extending from head tube 36 in alternative embodiments and is not limited to that shown herein. A first end of the tubular member 42 may, for example, be coupled to the head tube 36 through a welding process or other suitable process.

In an exemplary embodiment, the second support element 40 may include a generally U-shaped support member 44 having a central portion and end portions on either side thereof. The central portion is configured to be coupled to the second end of the tubular member 42, such as through a welding process or other suitable process. Moreover, each end portion may include a rear wheel 50 rotatably coupled adjacent an end thereof so as to allow rotation of the rear wheels 50 relative to the rear frame 14. The second support element 40 may further include a central support post 52 having a first end coupled to the second end of tubular member 42 or to the U-shaped member 44 and which may extend generally centrally between the end portions and lie generally within the same plane as generally defined by the U-shaped member 44. As discussed in more detail below, the central support post 52 may be configured to receive a seat assembly for providing a seat for a child using the vehicle 10.

As shown in these figures, the rear frame 14 further includes a deck 54 configured to be coupled to and generally overlie the second support element 40. In this regard and in one embodiment, the deck 54 may have a U-shaped configuration generally corresponding to the shape of the second support element 40 (e.g., U-shaped member 44). The deck 54 may include an upper, generally planar surface 56, a peripheral downturned lip or flange 58, and a bottom surface (not shown) opposite the upper surface 56. The bottom surface may include a plurality of ribs (not shown) to provide additional structural support to the deck 54 and to define channels for receiving at least portions of second support element 40 therein. Additionally, the bottom surface may include one or more connecting members (not shown) configured to receive fasteners (e.g., screws or the like) for securing the deck 54 to the rear frame 14. The peripheral flange 58 may be configured so as to at least partially surround or cover the U-shaped member 44. In this way, the U-shaped member 44 may be hidden from view when observed from the top of the side of the vehicle 10, for example.

Figure 3:
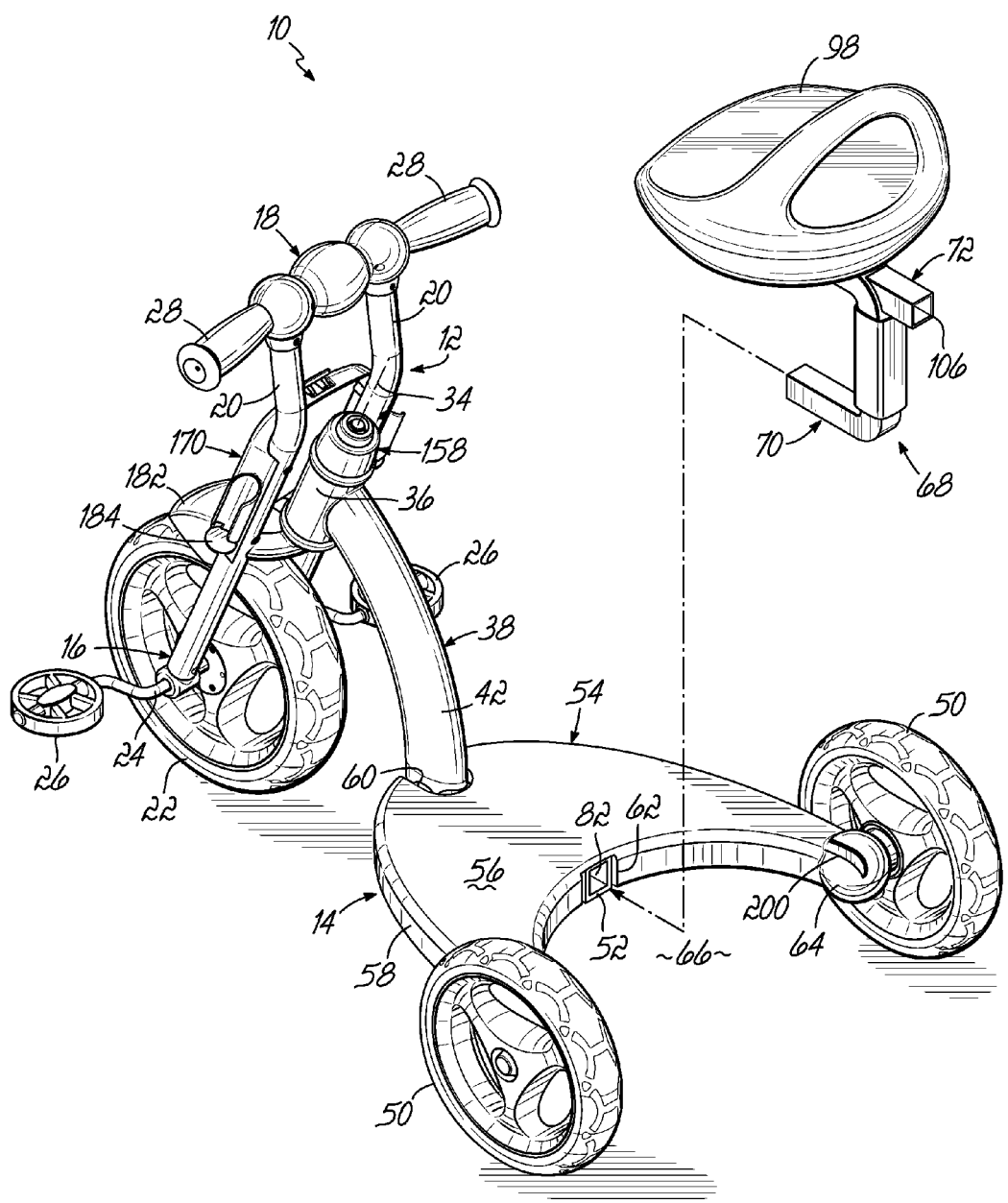
FIG. 3 is a perspective view of the child vehicle of FIGS. 1 and 2 with the seat removed, such that the vehicle now has a scooter configuration.

The deck 54 may include a first cutout 60 configured to receive a portion of the tubular member 42 therein when the deck 54 is coupled to the second support element 40. A second cutout 62 may also be formed in the peripheral flange 58 so as to expose a free end of the central support post 52, as illustrated in FIG. 3. In one embodiment, the deck 54 may include generally spherical lobes 64 (one shown) adjacent the ends of the U-shaped member 44 where the rear wheels 50 couple to the vehicle 10 (e.g., the second support element 40). The lobes 64 may be configured to cover this coupling and/or provide a more aesthetically pleasing appearance to the vehicle 10. Additionally, as further illustrated in FIG. 3, the corresponding U-shaped configuration of the second support element 40 and deck 54 defines a generally U-shaped opening 66 generally disposed between the two rear wheels 50. As explained below, this opening 66 may be utilized to provide various add-on items to the vehicle 10.

The elements that form the rear frame 14 may be formed from a variety of materials. For example, the U-shaped member 44 and central support post 52 may be formed from metal (e.g., metal tubing) and have a circular, oval, or other suitable cross-sectional shape. For example, as explained in more detail below, the central support post 52 may have a generally square or rectangular cross-sectional shape. However, these materials and shapes are exemplary and it should be recognized that other materials and shapes may be used. In contrast, the deck 54 may be molded from suitable engineering plastics, including for example, polypropylene, polyethylene or other suitable plastics. However, the invention is not so limited as the deck 54 may be formed from other suitable materials and other processes.

In one aspect in accordance with the invention, the vehicle 10 includes a seat assembly, generally shown at 68, that is selectively removable from the vehicle 10. By way of example, as shown in FIGS. 1 and 2, when the seat assembly 68 is coupled to the vehicle 10, the vehicle 10 has a tricycle configuration and the seat assembly 68 is configured to support the rider of the vehicle thereon. In contrast, and as illustrated in FIG. 3, when the seat assembly 68 is removed from the vehicle 10, the vehicle has a scooter configuration wherein the deck 54 is exposed and configured to receive one or both feet of the rider. The particular configuration of the vehicle 10 when the seat assembly 68 is removed therefrom may be referred to as a chariot scooter. In the scooter configuration, the child may operate the convertible vehicle 10 in a manner that is conventional to scooters, namely, positioning one foot on the deck 54 while the other foot is positioned on the ground adjacent the deck 54. By pushing off the ground, the child is able to propel the vehicle 10 forward and steer by pivoting the handlebar 18.

As shown in more detail in FIGS. 4 and 4A, in one embodiment the seat assembly 68 may include a generally U-shaped bracket having a lower tubular post 70 and an upper tubular post 72 telescopingly coupled to lower post 70, as explained below. The lower post 70 may be generally L-shaped and include a first leg 74 and a second leg 76 extending therefrom. The upper post 72 may also be L-shaped having a first leg 78 and a second leg 80 extending therefrom. The first leg 74 of lower post 70 is configured to couple to the central support post 52 of rear frame 14 so as to support the seat assembly 68 on vehicle 10. More particularly, an end of the first leg 74 is sized so as to be received within an opening 82 in the free end of central support post 52 exposed by second cutout 62 of deck 54 (FIG. 3).

In one embodiment, the coupling between the first leg 74 of lower post 70 and central support post 52 may be achieved through an adjustable push pin locking mechanism. As shown best in FIG. 4A, a push pin 86 may be disposed within first leg 74 adjacent an end thereof and include at least one projection or button 88 coupled to an end of a U-shaped spring member 90. The spring member 90 is configured to bias the ends thereof in an outward direction and away from each other. As the first leg 74 of the lower post 70 slides within the opening 82 in central support post 52, the at least one button 88 is biased slightly inwardly and extends only through an aperture 92 through a wall of the first leg 74. Once the lower post 70 has been sufficiently inserted within the central support post 52, the aperture 92 in the first leg 74 is configured to align with an aperture 94 formed through a wall of the central support post 52. When so aligned, the button 88 is unconstrained and springs outwardly due to the bias of spring member 90 to reside within both apertures 92, 94. When the button 88 is disposed through the apertures 92, 94, the seat assembly 68 is secured to the vehicle 10 and telescopic movement of the lower post 70 relative the central support post 54 is prevented.

In one embodiment, the central support post 52 may include a plurality of apertures 94 configured to receive the button 88 therein. Such a plurality of apertures 94 provide for an adjustment feature of the seat assembly 68 relative to the vehicle 10. Additionally, it should be recognized that to facilitate such an adjustment feature, the push button 88 should be accessible when it extends through both apertures 92, 94 in a locked position. In this regard, in one embodiment, the push button 88 and apertures 92, 94 may be arranged such that the push button 88 projects from a lower surface of the central support post 52. In this way, the push button 88 is accessible by reaching underneath the deck 54. Accordingly, to adjust the position of the seat assembly 68 relative to the vehicle 10 in a first direction (e.g., generally horizontal direction), the button 88 may be pushed inwardly until the button 88 disengages from the aperture 94 in the central support post 52 (but still engages with the aperture 92 in the first leg 74 of lower post 70. The seat assembly 68 is then moved in the first direction until the button 88 aligns with another aperture 94 in the central support post 52 and springs outwardly to reside within both apertures 92, 94 and relock the seat assembly 68 to the vehicle 10.

While the first leg 74 of the lower post 70 may be configured to couple to the vehicle 10, the first leg 78 of the upper post 72 may be configured to couple to a seat 98 configured to support the rider when the seat assembly 68 is coupled to the vehicle 10 and in a tricycle configuration. A wide variety of seats may be used on the vehicle 10 and the invention is not limited to the particular seat shown herein. Additionally, the seat 98 may be coupled to the first leg 78 in any conventional manner, such as with suitable fasteners (screws, rivets, etc.) or other methods used in the industry.

Figure 4:
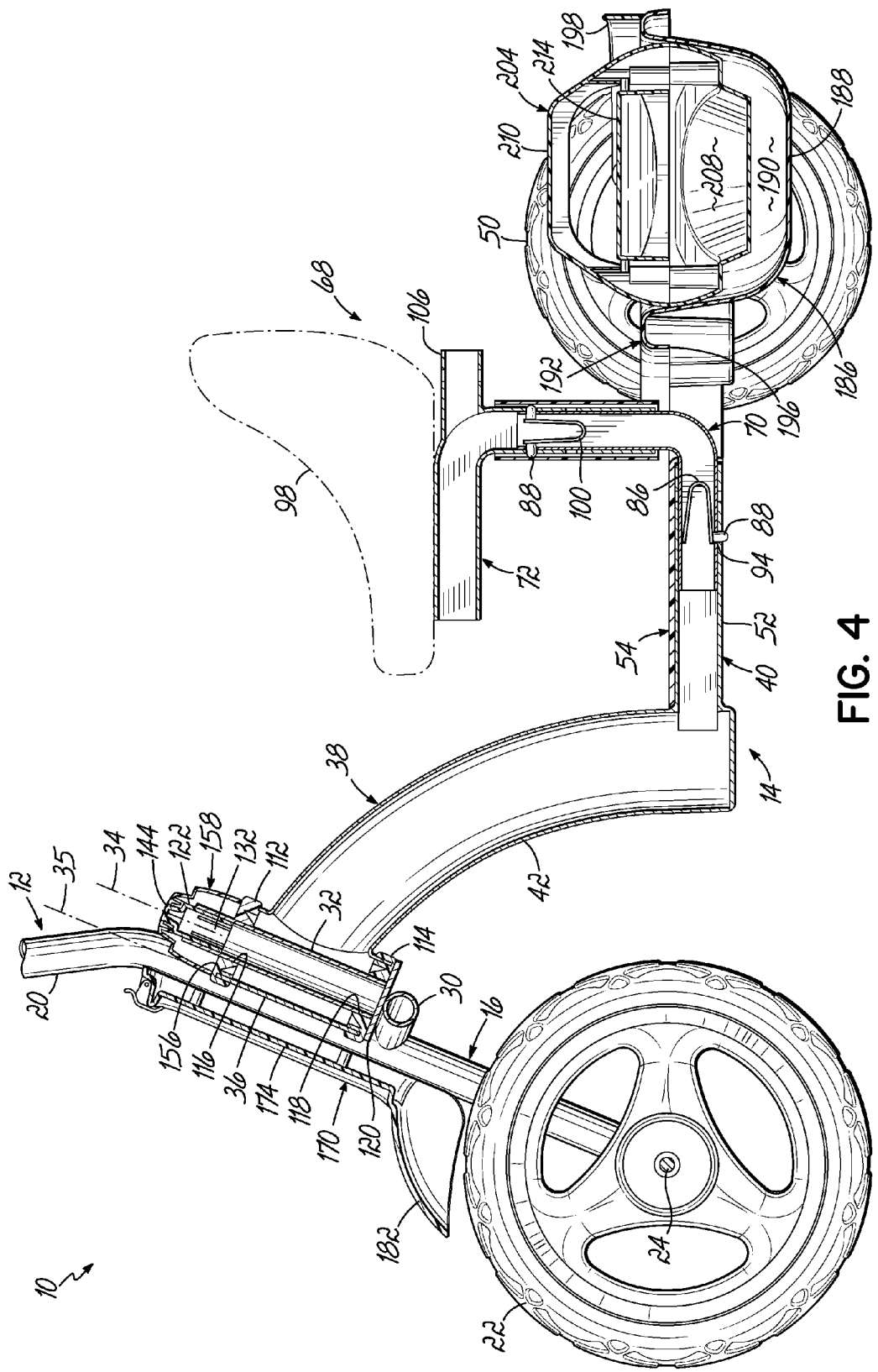
FIG. 4 is a cross-sectional view taken along line 4-4 of FIG. 2.
Figure 4A:
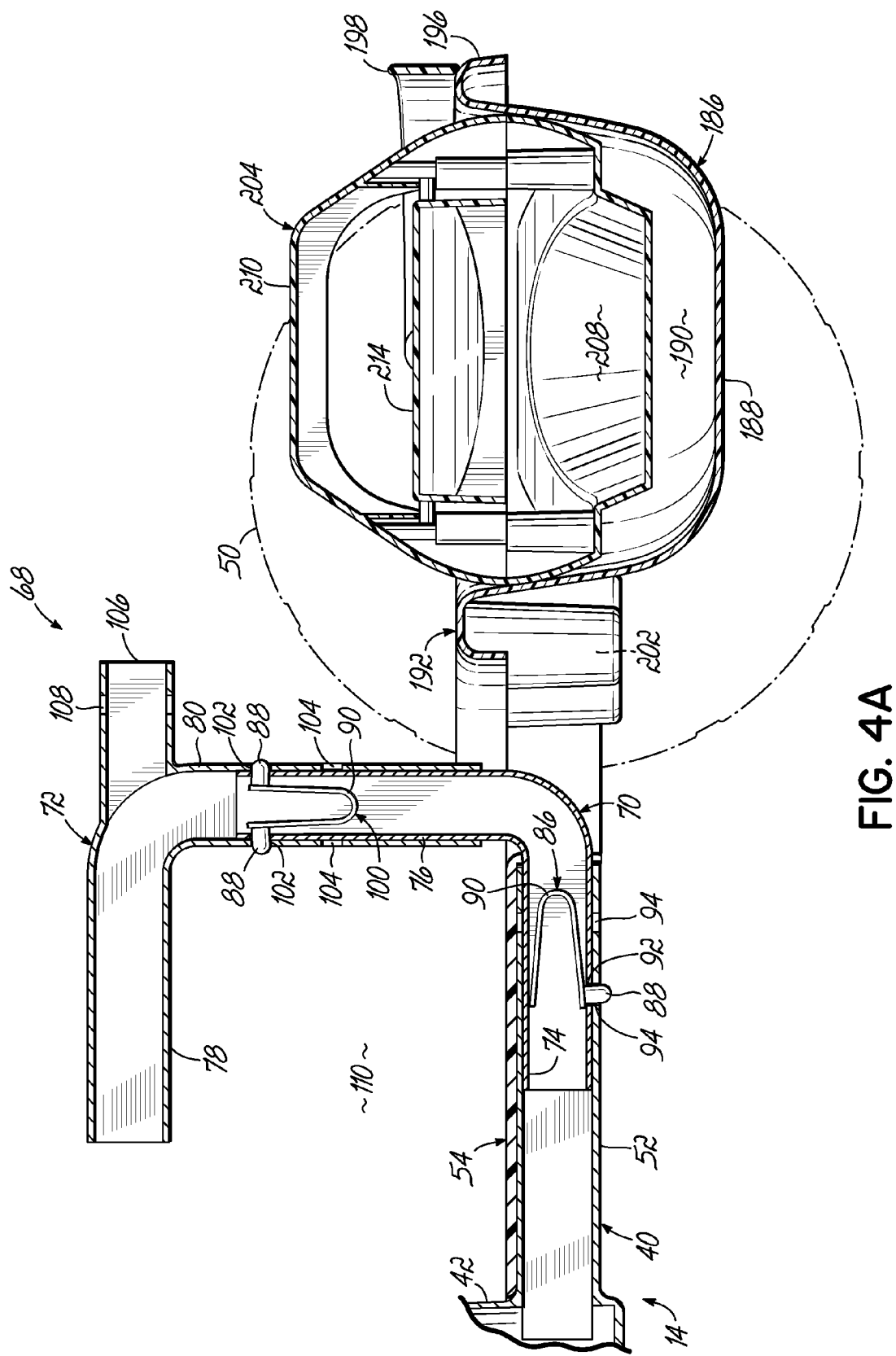
FIG. 4A is an enlarged view of a portion of FIG. 4.

As illustrated in FIGS. 4 and 4A, the second leg 80 of the upper post 72 is configured to be telescopingly received over the second leg 76 of the lower post 70 so as to couple the posts 70, 72 together. In one embodiment, the coupling between the upper and lower posts 72, 70 may be achieved through an adjustable push pin locking mechanism similar to that described above. In that regard, a push pin 100 having spring member 90 and opposed buttons 88 may be disposed in the second leg 76 of the lower member 70 and cooperate with apertures 102, 104 in lower and upper posts 70, 72, respectively, in a manner similar to that described above. As those of ordinary skill in the art will readily appreciate the operation of the push pin locking mechanism between the upper and lower posts 72, 70 based on the description above, no further description will be provided herein. However, it should be realized that the push pin locking mechanism between the upper and lower posts 72, 70 provides for adjusting the seat 98 in a second direction (e.g., generally vertical direction) relative to the vehicle 10. Additionally, a sleeve may be disposed about the coupling between the posts 70, 72 to prevent or reduce the likelihood of actuating the push pin locking mechanism. Moreover, while push pin locking mechanisms have been disclosed herein, other locking mechanisms may be used to secure the seat assembly 68 to the vehicle 10 and/or provide an adjustment feature.

In one embodiment, the lower and upper posts 70, 72 may be made from metal tubing capable of withstanding the loads placed thereon. Other materials, however, may also be possible including various engineering plastics capable of withstanding the loads on the seat assembly 68. Additionally, the lower and upper posts 70, 72 may have a non-circular cross-sectional shape, including, for example, a square or rectangular cross-sectional shape, as shown. In this regard, a non-circular cross-sectional shape prevents relative rotation between the various members of the seat assembly 68 and between the seat assembly 68 and the vehicle 10. Thus, for example, the non-circular cross section of the first leg 74 of the lower post 70 and the corresponding cross section of the opening 82 in the free end of the central support post 52 prevent the seat assembly 68 from rotating to one side or the other and toward the deck 54. Similarly, the non-circular cross section of the second legs 76, 80 of the lower and upper posts 70, 72, respectively, prevents relative rotation between the posts about an axis generally parallel to the second legs 76, 80. In addition to the above, the non-circular cross-sectional shape reduces the loads that are normally imposed on the locking mechanisms. For example, with circular tubes, a push pin locking mechanism would have to resist loads in both a longitudinal direction (e.g., pulling the members apart) and a circumferential direction (e.g., rotating the members). With tubing having non-circular cross sections, the circumferential loading is accommodated by the tubing, and not by the locking mechanism. Accordingly, the locking mechanism may not wear as quickly and may remain more reliable during the useful life of the vehicle.

As best shown in FIGS. 4 and 4A, the seat assembly 68 may also include a push bar attachment 106 for coupling an adult push bar (not shown) to propel the vehicle 10 when, for example, the child is too small to reach the pedals 26 or too tired to propel the vehicle under his or her own power. By way of example, a push bar similar to that shown and described in U.S. Application Ser. No. 61/184,951 filed on Jun. 8, 2009, the disclosure of which is incorporated by reference herein in its entirety, may be used, other push bars, however, may also be used. In one embodiment, the push bar attachment 106 may be formed in the upper post 72 and may, for example, extend in a direction opposite the second leg 80 thereof. This directs the attachment 106 toward the rear of the vehicle 10 to facilitate use by an adult walking behind the vehicle 10, for example. The attachment 106 may include one or more apertures 108 that cooperate with a push pin locking mechanism (not shown) disposed either in the attachment 106 itself or in the push bar, to facilitate coupling to the attachment 106. The attachment 106 may further have a non-circular cross section to prevent relative rotation between it and the push bar which is to be coupled thereto.

The design of the seat assembly 68 and its coupling to the vehicle 10 may provide a number of advantages or aspects not appreciated by the industry. In this regard, the U-shaped bracket of the seat assembly 68 places the member that couples the seat 98 to the vehicle 10 (i.e., the second legs 76, 80) generally behind the seat 98 and not directly or substantially underneath the seat as is typically the case. This in turn creates a void or open region 110 generally beneath the seat 98 and above the deck 54 (FIG. 4A). A rider may then fold or dangle his or her legs beneath the seat 98 as might be done, for example, when sitting in a chair. It is believed that such a configuration increases the comfort of the rider when, for example, an adult is pushing the child or the vehicle is at rest and a child remains seated on the vehicle 10.

Another advantage to the design of the seat assembly 68 is that because the coupling between the seat assembly 68 and the vehicle 10 is primarily in a horizontal direction (as opposed to a vertical direction), no portion of the seat assembly 68 sticks out below the deck 54 when the seat assembly 68 is attached to the vehicle 10, creating, for example, a safety concern. Additionally, when the seat assembly 68 is removed from the vehicle 10, no part of the structure that supports the seat assembly 68 (e.g., central support post 52) extends above the deck 54 so as to interfere or be of a concern during operation of the vehicle 10 in the scooter configuration. Instead, such support structure remains covered below the deck 54 and out of the way. In this regard, the upper surface 56 of the deck 54 defines a deck plane that supports the feet of the rider and the seat assembly couples to the rear frame 14 at a location spaced from (e.g., beneath) the deck plane. In this way, for example, the upper surface 56 is uninterrupted by the coupling of the seat assembly 68. More particularly, the vertical post 52 and the first leg 74 of the lower leg 70, which engage to couple the seat assembly 68 to the vehicle 10, extend in a direction generally parallel to the deck plane. The second legs 76, 80 of the posts 70, 72 (which position the seat 98 vertically relative to deck 54) may then be positioned within the opening 66 between the rear wheels 50 and defined by a rear edge of deck 54.

In another aspect in accordance with the invention, the vehicle 10 may be configured to be assembled in a tool-less manner so as to avoid the costs, frustrations, and product returns that often accompany tool-based assembled products. In this regard, in order to transport a product from a manufacturing facility to a retail outlet or other location, the product will typically not be fully assembled, but will include several separate pieces that must be subsequently assembled. Breaking the product into several pieces may, for example, allow the product to fit inside a box suitable for shipping and/or displaying. In reference to the vehicle 10, it is contemplated that the front frame 12 may be assembled as a separate piece, the rear frame 14 may be assembled as a separate piece, and the seat assembly 68 may be a separate piece. In one embodiment, it is contemplated that these separate pieces may be individually assembled at the manufacturing facility prior to shipping. However, these pieces must then be assembled to form the vehicle 10. As noted above, this may be accomplished in the present invention in a tool-less manner and either at the retail level of by the consumer at home.

To this end, and as discussed in detail above, the seat assembly 68 may couple to the rear frame 14 of the vehicle 10 in a tool-less manner. More specifically, the push button locking mechanisms described above, allow the seat assembly 68 to be coupled to (and released from) the vehicle 10 without the use of any tools. Thus, to achieve a tool-less assembly of the vehicle 10, the front and rear frames 12, 14 should be configured to couple in a tool-less manner, but yet not compromise the ability of the coupling to provide pivotal movement between the front and rear frames 12, 14. The details of such a tool-less coupling between the front and rear frames 12, 14 will now be described.

As previously discussed, and as illustrated in FIGS. 4 and 5, the front frame 12 couples to the rear frame 14 via the head tube 36 being received over the post 32 on the crossbar 30 of the front frame 12. In this regard, the head tube 36 includes a generally hollow cylindrical body having upper and lower ends through which post 32 may be received. To support the post 32, and thus front frame 12, the head tube 36 may include an upper head tube spacer 112 coupled to the upper end thereof, and a lower head tube spacer 114 coupled to the lower end thereof. The upper and lower head tube spacers 112, 114 may be secured to the head tube 36 and configured to support the front frame 12 within head tube 36, yet allow rotation of the front frame 12 relative to the head tube 36 and thus rear frame 14. The head tube spacers 112, 114 may be configured to reduce sharp edges associated with the head tube 36, and/or reduce the friction associated with pivoting motion of the rear frame 14 relative to the front frame 12. In one embodiment, the upper and lower head tube spacers 112, 114 may be formed from a suitable plastic, although other materials are possible. As noted above, the upper and lower head tube spacers 112, 114 may come preassembled to the head tube 36. Alternatively, the head tube spacers 112, 114 may be secured to the respective ends of the head tube 36 in a tool-less manner, such as through a friction fit.

The upper and lower head tube spacers 112, 114, may include apertures 116, 118, respectively, for snugly, but movably, receiving post 32 therein. To support the head tube 36 on front frame 12, the post 32 may include a support surface 120, which may, for example, engage the lower end of the lower head tube spacer 114. In one embodiment, the support surface 120 may include a washer disposed over the post 32 and adjacent the intersection of the post 32 with crossbar 30. Other support surfaces are also possible and may be positioned at other locations along post 32.

Figure 5A:
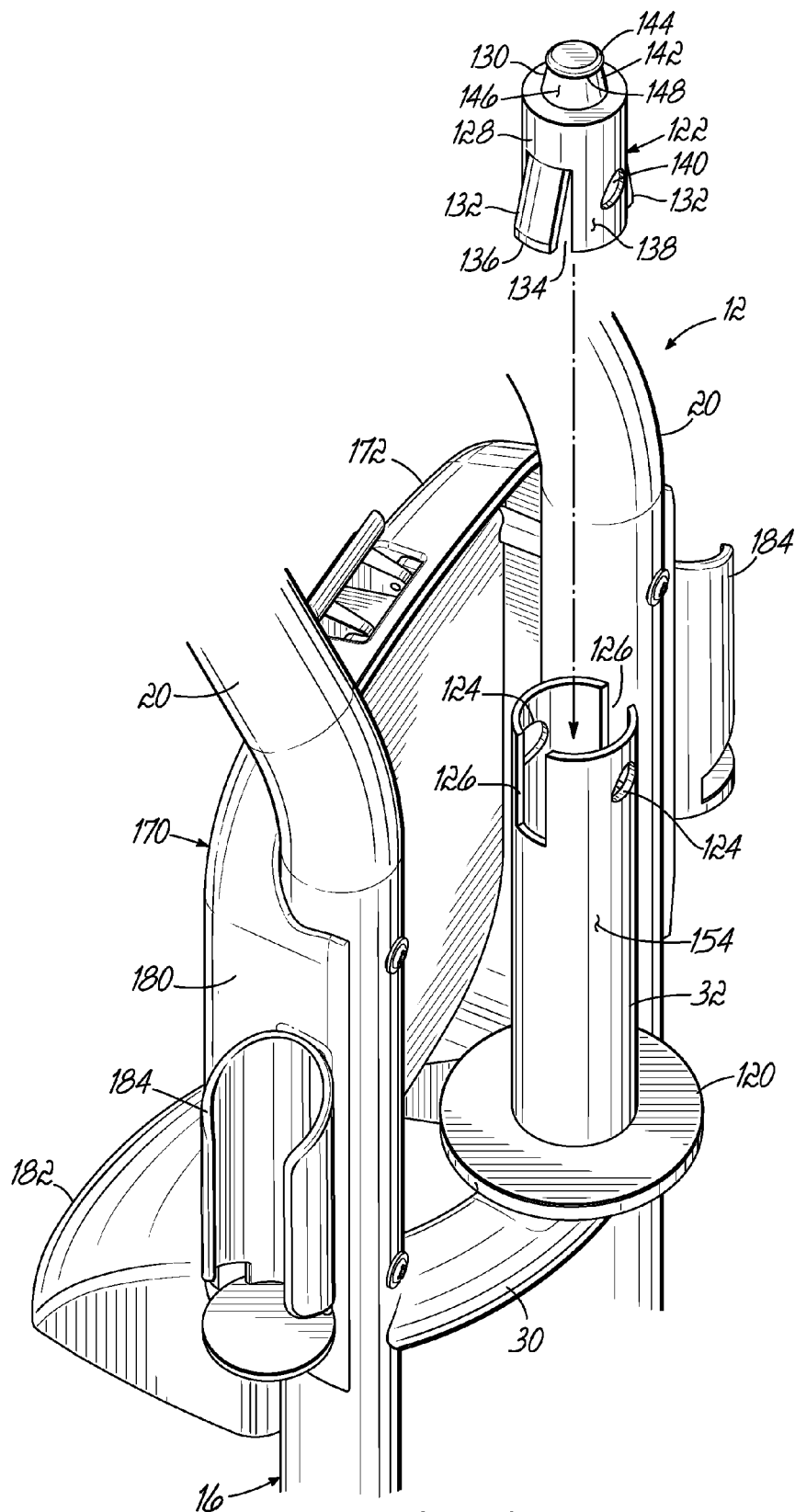
FIG. 5A is an enlarged view of a portion of FIG. 5.

The post 32 may be inserted through the head tube 36 such that an upper end of the post 32 extends above the upper head tube spacer 112 (FIG. 4). A tool-less locking mechanism may be coupled to the post 32 to secure its coupling to head tube 36. As best shown in FIGS. 5 and 5A, the locking mechanism includes a locking insert 122 configured to be coupled to the free end of the post 32. In this regard, and for reasons that are explained below, the free end of the post 32 includes a pair of generally aligned apertures 124 formed through the wall of the post 32, and a pair of generally aligned slots 126 formed through the wall of the post 32. As shown, the apertures 124 and slots 126 may be circumferentially offset from each other, such as for example, by approximately 90 degrees, though other amounts or degrees of offset are possible.

The locking insert 122 includes a body having a lower body portion 128 and an upper body portion 130. The lower body portion 128 may be generally cylindrical (e.g., tubular) and sized so as to fit through an opening and within a passageway of post 32. The lower body portion 128 further includes a pair of opposed, generally flexible tabs 132 depending therefrom. More particularly, the tabs 132 reside within slots 134 formed in the lower body portion 128 and are coupled to the body at an upper end of the slots 134. The lower end of the tabs 132 are free to flex relative to the locking insert 122 in a generally radially inward and outward direction (e.g., relative to a central axis of the locking insert) and define a bearing surface 136. The flexible tabs 132 may be biased generally radially outward to a position wherein at least a portion of the tabs 132, and more particularly the lower free end and bearing surface 136 thereof, is generally outward of an outer surface 138 of the lower body portion 128. In other words, the tabs 132 stick out beyond the outer surface 138 of the lower body portion 128 and may have a diverging configuration (relative to the central axis of the locking insert) in a direction from the upper end of the locking insert 122 and toward the lower end of the locking insert 122.

Additionally, a pair of opposed apertures 140 may be formed through the walls of the lower body portion 128. For reasons that will become clearer below, the apertures 140 bear a positional relationship to the tabs 132 corresponding to the positional relationship between the apertures 124 and slots 126 formed in the free end of the post 32. For example, in one embodiment, the apertures 140 may be circumferentially offset from the tabs 132 by approximately 90 degrees. Again, however, other amounts or degrees are also possible.

The upper body portion 130 may, in an exemplary embodiment, include a generally conical section 142 a lower end of which is coupled to the upper end of the lower body portion 128 and an upper end of which includes a generally disc-shaped button 144. The button 144 extends radially outward of an outer surface 146 of the conical section 142 to define an annular shoulder or lip 148. The transition between the lower and upper body portions 128, 130 defines a shoulder 152 that is spaced from the shoulder 148 defined by button 144. In an exemplary embodiment, the locking insert 122 may be molded as an integral piece from a suitable plastic material, for example. However, it should be realized that the locking insert may include multiple pieces coupled together and be formed from other materials and through other processes.

To couple the locking insert 122 to the free end of the post 32, the locking insert 122 is oriented relative to the post 32 such that the flexible tabs 132 are aligned with the slots 126 in the post 32. The locking insert 122 may then be inserted through an opening in the free end of the post 32 that is in communication with a passageway through post 32. As mentioned above, at least a portion of the lower body portion 128 is sized to fit within the passageway of post 32 and the tabs 132 fit within the slots 126. The locking insert 122 is slidably received in the post 32 until the apertures 124 in the post 32 align with the apertures 140 in the locking insert 122. At this point a suitable fastener (e.g., nut and bolt, screw, rivet, etc.) may be used to secure the locking insert 122 to the post 32, as shown in FIG. 5. When so coupled, the flexible tabs 132 extend through the slots 126 and outward of the outer surface 154 of post 32 such that at least a portion of the bearing surface 136 is outward of outer surface 154. However, it should be realized that the flexible tabs 132 are capable of flexing generally inward toward the outer surface 154 of post 32. Additionally, for reasons that will become clearer below, the upper body portion 130 may extend above the free end of the post 32.

With the locking insert 122 coupled to the post 32, as described above, which may be done at the manufacturing facility and prior to delivery to a retail outlet, the front frame 12 may be coupled to the rear frame 14 in a tool-less manner. For example, this tool-less assembly may be done by someone at the retail store or by the consumer in the home environment. In any event, to couple the front and rear frames 12, 14, the head tube 36 of the rear frame 14 may be slid over the free end of the post 32. Due to the direction of coupling and the diverging configuration of the flexible tabs 132, the tabs 132 flex inwardly such that the post 32 is able to pass through the apertures 116, 118 of the upper and lower head tube spacers 112, 114, respectively.

When the head tube 36 is fully seated on the post 32, the lower head tube spacer 114 may engage the support surface 120 and be supported thereby. Additionally, when fully seated, the flexible tabs 132 may be positioned above an upper end surface 156 of the upper head tube spacer 112 such that the tabs 132 are free to flex outwardly again after having passed through head tube 36. In this way, the bearing surface 136 of the tabs 132 engage or are adjacent the upper end surface 156 of the upper head tube spacer 112 (FIG. 4). Through this configuration, any upward movement of the head tube 36 relative to the post 32 may be substantially prohibited by engagement of the bearing surface 136 of tabs 132 with the upper surface 156 of the upper head tube spacer 112. Accordingly, the head tube 36 is essentially locked in place on the post 32 so as to couple the front and rear frames 12, 14. It should be realized, however, that while the head tube 36 is essentially locked to post 32, relative rotation between the front and rear frames 12, 14 is permitted.

Although the front and rear frames 12, 14 are coupled together as described above, the coupling may be released by pressing the flexible tabs 132 inwardly so as to allow the head tube 36 to pass back over the locking insert 122. More particularly, the tabs 132 may be pressed inwardly such that the bearing surfaces 136 thereof are no longer over the upper end surface 156, but are inward of the aperture 116. In this position, the head tube 36 may be moved off of post 32. Therefore, to avoid any unintentional releasing or unlocking of the front and rear frames 12, 14, the exposed portion of the locking insert 122 may be covered. In this regard, the vehicle 10 may be provided with a protective cap 158 configured to be coupled to the vehicle 10 so as to cover and protect the locking insert 122. To this end, the cap 158 may be generally cylindrical and includes a lower hub 160, an upper hub 162, and a plurality of generally flexible locking tabs 164 (FIG. 5). The cap 158 may, for example, be molded from a suitable engineering plastic, but other materials and processes are also possible.

The lower hub 160 is configured to be sized so as to engage the upper end surface 156 of the upper head tube spacer 112 adjacent its periphery. Accordingly, a substantial portion of the upper end surface 156 may be covered by the protective cap 158. The upper hub 162 extends from an upper end of the lower hub 160 and has a reduced cross-sectional dimension as compared to the lower hub 160. The flexible locking tabs 164 may be recessed within the upper hub 162 so as to be radially surrounded thereby, and further may be angled radially inwardly (e.g., converging) toward, for example, a central axis of the cap 158. Additionally, the upper end of the locking tabs 164 may be below or aligned with the upper end of the upper hub 162 so as not to extend therebeyond. The flexible tabs 164 are configured to flex in a generally radially inward and outward direction. Furthermore, the cap 158 includes a passageway configured to receive a portion of the post 32 and/or a portion of the locking insert 122 therethrough. More particularly, for reasons provided below, the passageway 166 defined by the flexible locking tabs 164 is smaller than the outer cross dimension of the button 144 on the locking insert 122.

To couple the protective cap 158 to the vehicle 10, the cap 158 may be aligned with the locking insert 122 and moved downwardly such that the locking insert 122 is positioned within the passageway of the cap 158. After sufficient movement, the button 144 on the upper end of the locking insert 122 engages the flexible locking tabs 164 and biases them outward so as to allow the button 144 to pass through passageway 166 and above the cap 158. When the button 144 passes beyond the locking tabs 164, the tabs 164 spring back inwardly so that the free ends thereof are positioned beneath the shoulder 148. In this position, the base or lower end of the locking tabs 164 (e.g., where they couple to the upper hub 162) may engage or nearly engage the shoulder 152 between the lower and upper hubs 160, 162 (FIG. 4). Such a configuration essentially locks the protective cap 158 to the locking insert 122 and prevents or reduces the likelihood of an unintentional actuation of the flexible tabs 132 that might uncouple the front and rear frames 12, 14.

As discussed above, children often have a strong desire to customize their possessions to express individuality and personality, and conventional bikes, scooters, trikes and other child vehicles may not offer much, if any, potential for customization. Thus, in accordance with a further aspect of the invention, to effectuate the purpose of allowing the child to create artistic expressions, and thereby personalize their vehicle 10, the vehicle 10 may incorporate one or more graphical interfaces that allow the child to mark thereon using a wide variety of writing or marking utensils. For example, the graphical interfaces may be configured to be marked on using, without limitation, pencils, pens, markers, chalk, water-color paints, crayons and possibly other marking utensils. Such marking utensils can be readily purchased from a wide variety of retail outlets. By way of example, marking utensils offered by Crayola, LLC of Easton, Pa. may be used to mark on the graphical interfaces. This may include, without limitation, Crayola® crayons, washable markers, sidewalk chalk and sidewalk crayons. Other manufacturers, however, may also provide marking utensils that can be used to mark on the graphical interfaces.

In one embodiment, a graphical interface may be provided by a placard 170, which may, for example, be coupled to the legs 20 of the front frame 12 (e.g., such as at the manufacturing facility) by suitable fasteners (e.g., screws, rivets, bolts, etc.). The placard 170 may include a generally rectangular frame 172 and a working surface 174 generally disposed within the frame 172 (FIG. 1). The frame 172 may include a pair of opposed side members 176 and a pair of end members 178 in a generally rectangular configuration. In one embodiment, the side members 176 may include extension flanges 180 (FIGS. 5 and 5A) that extend beyond the end members 178 so as to at least partially wrap around a corresponding leg 20 of the front frame 12. The frame 172 may be formed from a suitable engineering plastic through, for example, a molding process. However, the frame may be formed from other materials and through other processes as well.

As noted above, the frame 172 generally surrounds a working surface 174 that may, in one exemplary embodiment, be integrally formed with the frame 172. For example, the working surface 174 may be formed from the plastic that forms the frame 172. The plastic that forms the working surface 174 may be configured to facilitate marking thereon. In one embodiment, for example, the working surface 174 may include a matte finish that provides a sufficient surface roughness that allows the material of the marking utensils (e.g., pencil, chalk, crayons, etc.) to be deposited thereon when the utensil is in moving contact therewith. In addition to the above, the working surface 174 may also be configured in a manner that facilitates removal of the markings thereon. In this regard, and in a further embodiment, the working surface 174 may be formed from a surface of an art board integrated within the placard 170. Such art boards include, without limitation, dry erase boards, chalk boards, paint boards, and other boards suitable for drawing, coloring, painting, or otherwise marking thereon for creating an artistic expression.

In an alternative embodiment, the working surface 174 may include a substrate that is removably coupled to the placard 170 and positionable within frame 172. The substrate may be marked on prior to coupling to the placard 170 or be marked on after being coupled thereto. By way of example, the substrate may be an art board, as described above, removably coupled to the frame 172. The substrate may be a plastic member having a sufficient surface roughness. The substrate may also include most any paper used by children for drawing, coloring, or painting and may include, for example, notebook paper, construction paper, or a specialty paper, such as Crayola® Color Wonder, Color Explosion, or Color Surge paper. Other specialty papers from Crayola® or other manufacturers may also be used in accordance with this aspect of the invention. Other substrates, such as poster board or other cardboard materials may also be used. In this embodiment, the substrate may be coupled to the graphical interface through various means including, for example, providing a clip adjacent the frame 172 for retaining the substrate thereto. Other techniques, such as tape, glues, magnets, etc. may also be used to retain the substrate to the placard 170. Alternatively, though not specifically shown, the frame 172 of the placard 170 may be formed to include a slot through which the substrate slides so as to be positioned in and retained by the frame 172.

The inclusion of one or more graphical interfaces on the vehicle 10 allows a child to assert their individuality by personalization of the vehicle 10. This personalization may be achieved through the child's artistic expression. It is believed that personalizing the vehicle 10 in this manner will enhance the enjoyment experienced by the child though interacting with the vehicle 10. Additionally, the graphical interfaces increase the number of activities a child may do using the vehicle 10. Thus, in addition to riding the vehicle 10 in either configuration, a child may also use the vehicle 10 to draw, color, paint, etc. and explore the limits of his or her imagination.

The vehicle 10 may include additional features in further alternative embodiments. In this regard, in one embodiment, the placard 170 may include a fender 182 coupled thereto and configured to generally overlie at least a portion of the front wheel 22. In one embodiment, the fender 182 may be integrally formed with the frame 172 through, for example, a molding process. Alternatively, however, a fender may be formed separate from the placard 170 and subsequently coupled thereto, such as along the lower end member 178 thereof. The fender 182 may also be coupled to the front frame 12 at other locations, such as crossbar 30 or legs 20.

Additionally, placard 170 may include one or more holders 184 (two shown) configured to hold a marking utensil, such as those identified above, for marking on the graphical interface. In one embodiment, the holders 184 may be generally cylindrical having a closed bottom end. An opening may be formed through the wall thereof to gain access to the interior of the holder 184. In one embodiment, the holders 184 may be coupled to the extension flanges 180 extending from side members 176. It should be realized, however, that in alternative embodiments, the holders 184 may be located at other positions on the placard 170 or on vehicle 10.

In still a further aspect in accordance with the invention, the vehicle 10 may carry one or more compartments configured to carry and/or store various items. By way of example, the compartments may carry and/or store child appropriate marking utensils used to mark on the graphical interfaces included on the vehicle 10. The compartments may also carry additional sheets of paper for use with the graphical interface(s), or other toys as desired by the child. This ability to carry and/or store materials allows the child to enjoy additional activities with the vehicle beyond simply riding the vehicle. In this regard, and in reference to FIGS. 1, 2 and 6, such a compartment for the vehicle 10 may include a bin, generally shown at 186, which may be removably coupled to the vehicle 10.

In one embodiment, the bin 186 includes a bowl-shaped body 188 defining an open cavity 190 and a flange 192 defined about an upper periphery of the cavity 190. In one embodiment, the flange 192 may include a pair of ears 194 on one side of the cavity 190 (e.g., inner side) and adjacent opposite ends of the bin 186 and defines a generally arcuate edge therebetween. Such a configuration may give the bin 186 a generally cat-head shaped appearance when viewed from above. The flange 192 may further include a peripheral downturned lip 196, the purpose of which is described below.

Moreover, the bin 186 may include a pair of studs on opposing ends of the cavity 190 to which a handle 198 is hingedly attached.

Figure 6:
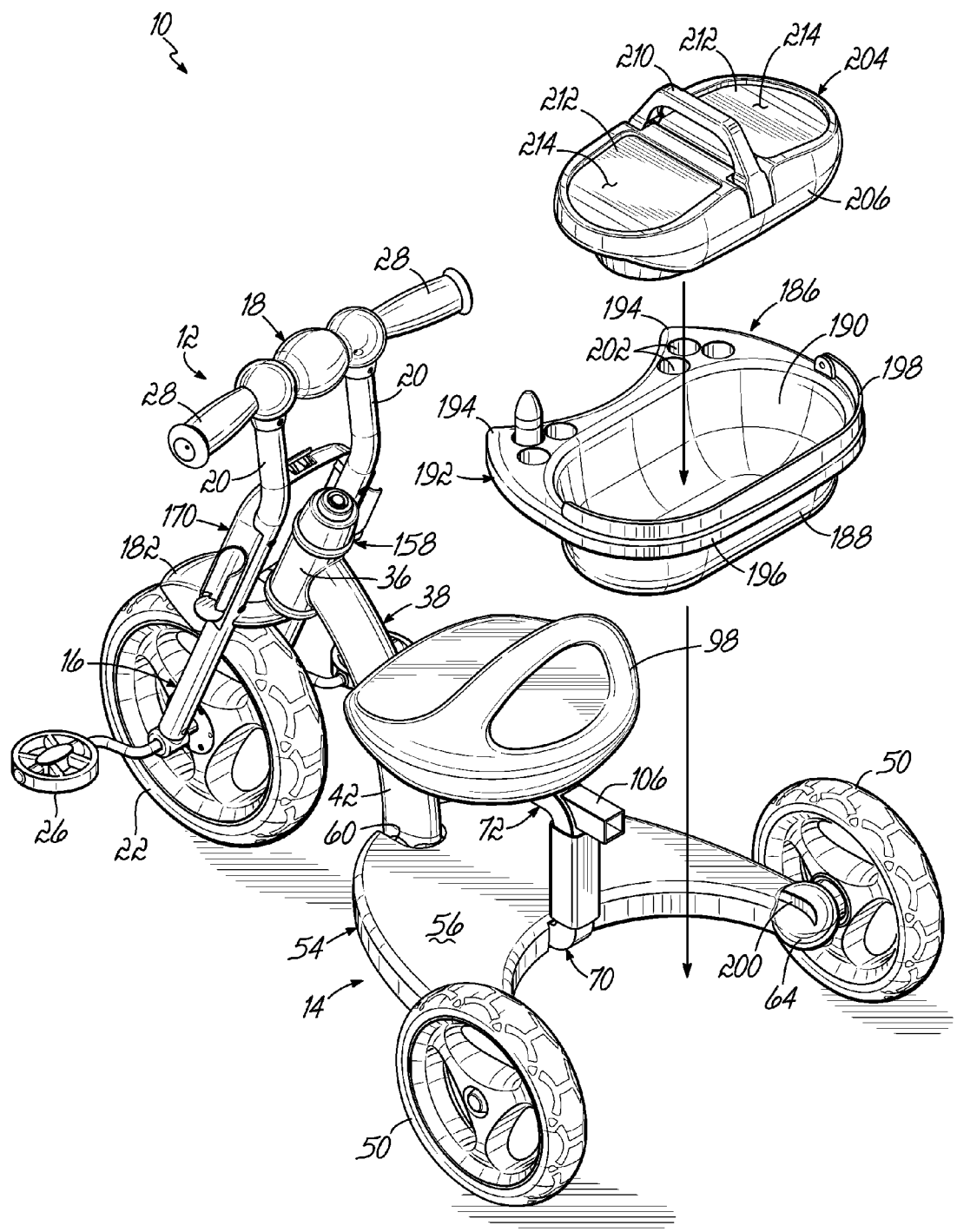
FIG. 6 is a rear perspective view of the child vehicle of FIGS. 1 and 2 illustrating the coupling of a bin and caddy to the vehicle.

The bin 186 may be configured to be removably coupled to the vehicle 10. More particularly, as shown in FIGS. 1, 2 and 6, the bin 186 may be coupled to the vehicle 10 generally within the U-shaped opening 66 between the rear wheels 50. As shown in FIG. 6, to secure the bin 186 to the vehicle 10, the generally spherical lobes 64 in the deck 54 may include a channel 200 formed therein configured to receive a portion of the downturned lip 196 on the flange 192 of the bin 186. Additionally, the upper surface 56 of the deck 54 may also include a channel (not shown) configured to receive a portion of the downturned lip 196 of the flange 192. The outer surface of the bowl-shaped body 188 may also include suitable indentations (not shown) configured to receive part of the spherical lobe 64 therein to further secure the bin 186 to the vehicle 10.

Such a coupling allows the bin 186 to be secured to the vehicle 10 when desired, so as to, for example, carry the bin 186 with the vehicle 10, but yet allows the bin 186 to be removed therefrom in an easy and convenient manner. In this regard, the bin 186 may be lifted upwardly away from the deck 54 such that the lip 196 disengages the channel 200. The bin 186 may then be moved to a desired location for the child to play with. Of course, the bin 186 may be placed back on the vehicle 10 and carried thereby to another location.

As noted in the figures, in addition to carrying and/or storing items in the cavity 190 of bin 186, the bin may further include one or more bores 202 formed, for example, in the ears 194 of the flange 192. The bores 202 may be configured to hold, for example, one or more marking utensil such as those described above. The bin 186 may be formed from suitable engineering plastics through, for example, a molding process. However, other materials and processes may also be used to form the bin.

Another compartment configured to carry and/or store various items, and be used with vehicle 10, includes a caddy, generally shown at 204. The caddy 204 includes a generally elliptically-shaped body 206 defining a cavity 208 formed therein. A handle 210 may be coupled to the body 206, such as adjacent a central portion thereof. In one embodiment, the handle 210 has a fixed position relative to the body 206. In an alternative embodiment, however, the handle 210 may be hingedly or otherwise movably coupled to the body 206. The caddy 204 may include at least one lid 212 movable between an open position providing access to the cavity 208, and a closed position covering an opening to the cavity 208. In one exemplary embodiment, two lids 212 are provided which are hingedly mounted to the body 206 adjacent a central portion thereof (e.g., adjacent handle 210).

Similar to the above, the caddy 204 may be configured to be removably coupled to the vehicle 10. More particularly, as shown in FIGS. 1, 2 4, 4A, and 6, the caddy 204 may be sized so as to be received in the open cavity 190 of bin 186 in, for example, a nesting relationship. Such a coupling allows the caddy 204 to be secured to the vehicle 10 (e.g., within bin 186) when desired, so as to, for example, carry the caddy 204 with the vehicle 10, but yet allows the caddy 204 to be removed therefrom in an easy and convenient manner. The caddy 204 may then be moved to a desired location for the child to play with. Of course, the caddy 204 may be placed back in the bin 186 and carried by the vehicle 10 to another location. The caddy 204 may be formed from suitable engineering plastics through, for example, a molding process. However, other materials and processes may also be used to form the bin.

In a further aspect of the invention, and in furtherance of the desire to allow children to customize their possessions, the lid(s) 212 of the caddy 204 may include an upper surface 214 that may operate as the working surface 174 of a graphical interface for the child to mark on. The various configurations of the working surface 174 on the caddy 204 are similar to that described above for working surface 174, and thus will not be described in detail here. Instead, one of ordinary skill in the art will understand how to configure upper surface 214 so as to operate as a working surface 174 of a graphical interface based on the description provided above.

The feature of incorporating a graphical interface into a child vehicle is not limited to the tricycle shown and described herein. Instead, it should be recognized that graphical interfaces may also be incorporated into other child vehicles so as to provide similar benefits to the child. In this regard, assignee's co-pending U.S. application Ser. No. 12/706,611, filed on Feb. 16, 2010 and entitled "Convertible and Steerable Scoot-A-Bout", the disclosure of which is incorporated by reference herein in its entirety, discloses graphical interfaces incorporated into a scoot-a-bout vehicle capable of converting between a ride-on configuration and a scooter configuration. Additionally, and in still a further embodiment, graphical interfaces may be incorporated into a child's bicycle to allow a child to customize their bike.

Figure 7:
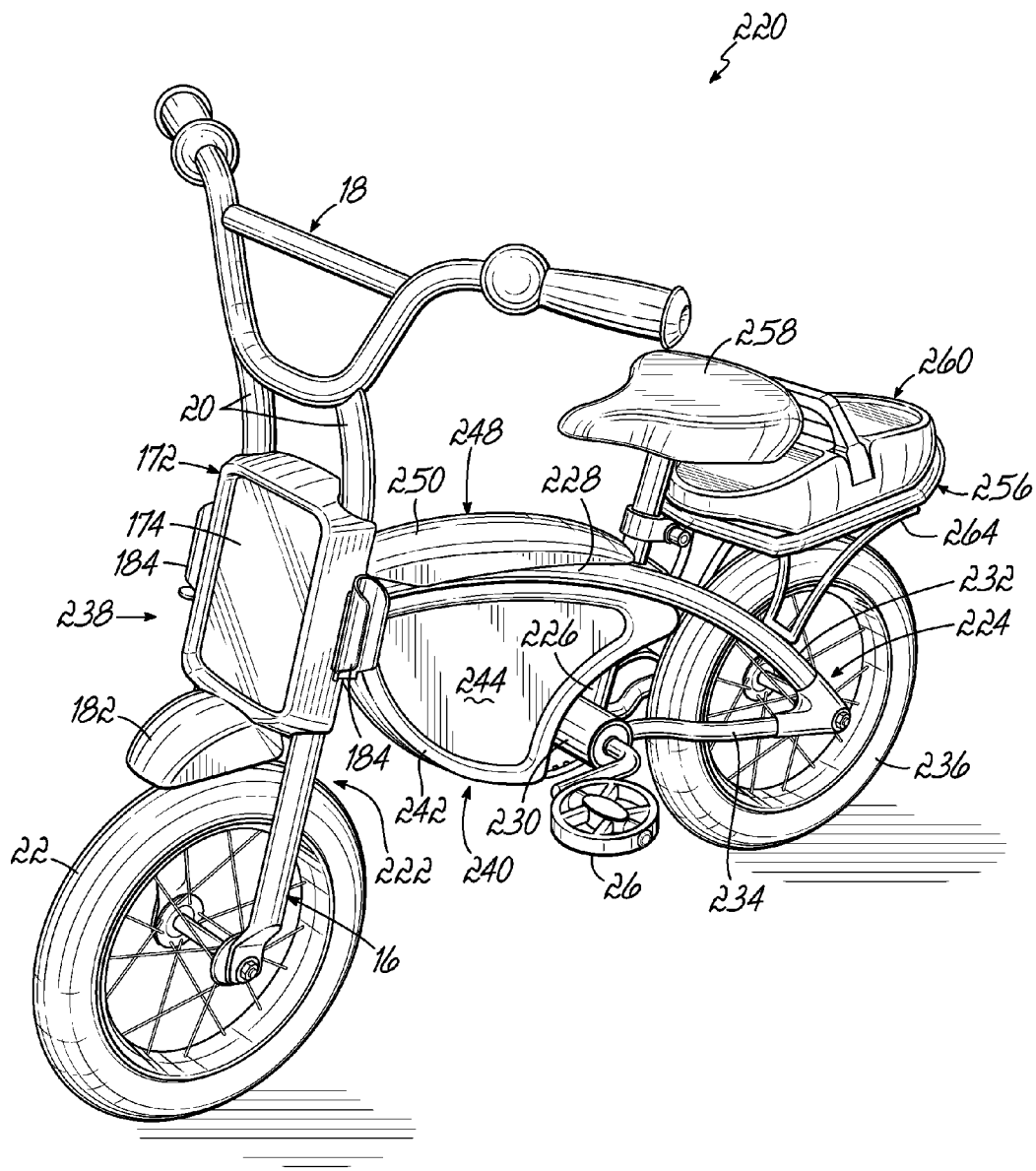
FIG. 7 is a perspective view of another illustrative embodiment of a child vehicle having a graphical interface in the form of a bicycle.

In this regard and as shown in FIG. 7, in which like reference numerals refer to like features in FIGS. 1-6, a bicycle 220 includes a front frame 222 and a rear frame 224 movably coupled relative to each other. The front frame 222 may be similar to front frame 12 as described above and as those of ordinary skill in the art will readily understand the construction of front frame 222 based on the description provided above, a further description will not be provided. The rear frame 224 includes a head tube (not shown), a seat tube 226, a top tube 228, a bottom bracket 230, a seat stay 232, a chain stay 234, and a rear wheel 236 in a generally conventional arrangement. The rear frame 224 may include a bottom tube or as illustrated herein, may lack a bottom tube. Additionally, though not shown, two training wheels may be coupled to the rear frame 224 to aid those children that are unable to independently balance the bicycle 220 while riding.

In one embodiment, the bicycle 220 may include a graphical interface in the form of a placard 238. The placard 238 may be similar to placard 170 discussed above and will not be further described herein. Those of ordinary skill in the art will readily understand the construction and implementation of placard 238 on bicycle 220 based on the description above.

Figure 8:
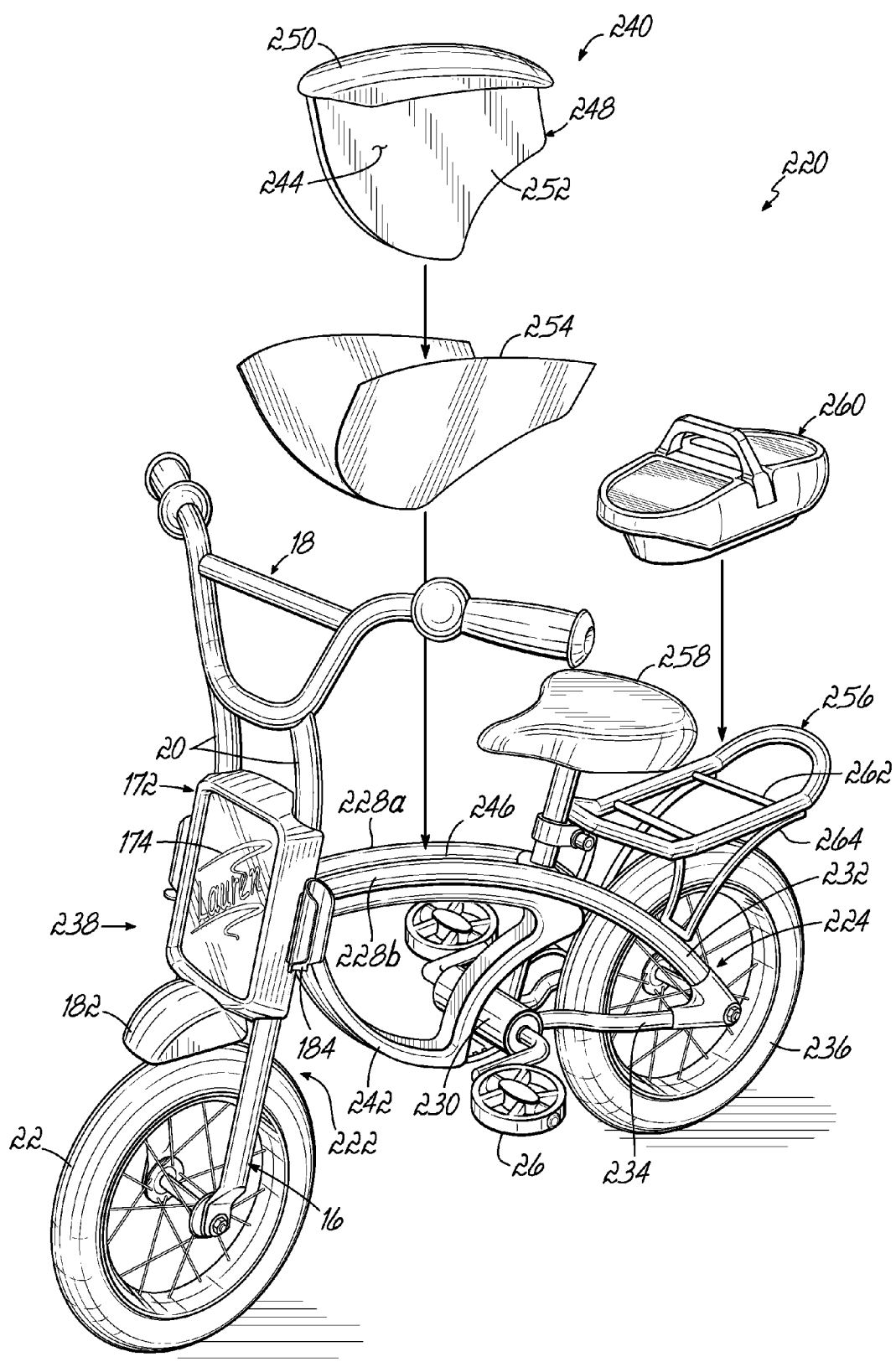
FIG. 8 is a perspective view of a child vehicle similar to FIG. 7 in accordance with another embodiment.

In another embodiment, however, the bicycle 220 may include a further placard 240 disposed generally beneath the top tube 228. Similar to the previously described placard, placard 240 may include a frame 242 and a working surface 244 generally disposed within the frame 242. While having a slightly different shape as compared to placard 170, the frame 242 and working surface 244 may be constructed similar to that described above. When the top tube 228 includes a single tubular member extending between the head tube and the seat tube 226, frame 242 may be coupled to the underside of the tube 228 using suitable fasteners (not shown). In an alternative embodiment, however, the top tube 228 may have a bifurcated design characterized by two generally parallel tubular members 228a, 228b extending between the head tube and the seat tube 226, as shown in FIGS. 7 and 8 that are spaced apart to define a gap 246.

In this embodiment, the frame 242 of placard 240 may be positioned beneath and coupled to both tubes and define an opening (not shown) in the frame 242 that is in registration with the gap 246 between the top tubes 228a, 228b. The placard 240 may further include a slider 248 removably coupled with the frame 242 and which may carry the working surface 244. In one embodiment, the slider 248 includes a handle 250 and a generally planar depending member 252 coupled thereto and defining opposed working surfaces 244 (e.g., both sides of depending member 252). The depending member 252 may be sized to fit in the gap 246 between the top tube members 228a, 228b and fit through the opening in the frame 242 so as to be disposed within the frame 242 when fully inserted therein. When fully inserted, the handle 250 may engage an upper surface of the top tube members 228a, 228b.

Similar to the above, in one embodiment, the surfaces of the depending member 252 may provide the working surface 174 of the graphical interface. Alternatively, however, a separate substrate may be used with the placard 240 to provide the working surface 174 of the graphical interface. To this end, FIG. 8 illustrates the incorporation of a separate substrate 254 (e.g., paper) with the placard 240. In one embodiment, the substrate 254 may be generally U-shaped (or be formed so as to be U-shaped) having two generally flat portions connected by a web. The substrate 254 may have a shape corresponding to the interior shape defined by the frame 242. The depending member 252 may be inserted between the flat portions of the substrate 254 such that the flat portions are adjacent the planar surfaces of the depending member 252 and the web is adjacent the lower edge of the depending member 252. The slider 248 and substrate 254 may then be inserted into frame 242. When so inserted, the substrate 254 forms the working surface 174 within the frame 242. Of course, the slider 248 may be removed and a different substrate, having a different design created by the child, may then be inserted within frame 242.

In further alternative embodiments, the bicycle 220 may include additional features. For example, the bicycle 220 may include a rack 256 coupled to the seat stays 232 (e.g., by welding or other suitable method) and generally disposed behind the seat 258. The rack 256 may be used in a conventional sense to carry various items. In an alternative embodiment, the rack 256 may carry a caddy 260, which may be similar to caddy 204 described above. The caddy 260 may carry, for example, marking utensils for marking on the graphical interfaces and/or additional substrates (e.g., paper). The caddy 260 may be further configured to couple to the rack 256 in a convenient manner. In this regard, the rack 256 may include at least one (two shown) crossbar 262, and the bottom surface of the caddy 260 may include a corresponding number of channels (not shown) formed therein. The channels may be configured to receive the crossbars 262 therein in a snap-fit manner. Furthermore, it should be realized that graphic interfaces may be included on other portions of the bicycle 220 as well. For example, placards may be coupled to the side supports 264 of the rack 256 (not shown). These placards would simulate saddlebags that are used with many conventional racks.

Figure 9A:
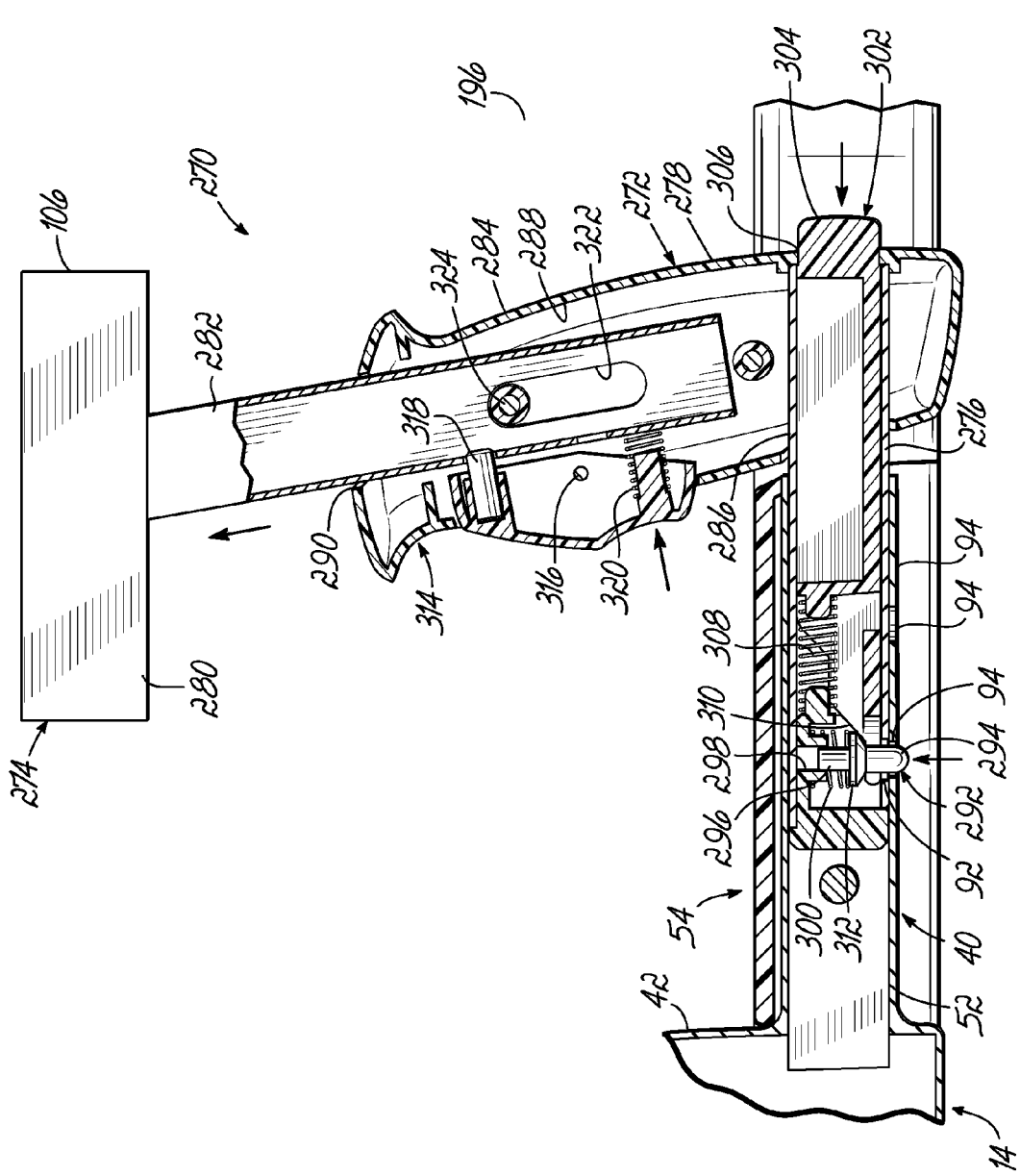
FIG. 9A is a cross-sectional view of an alternative seat assembly.
Figure 9B:
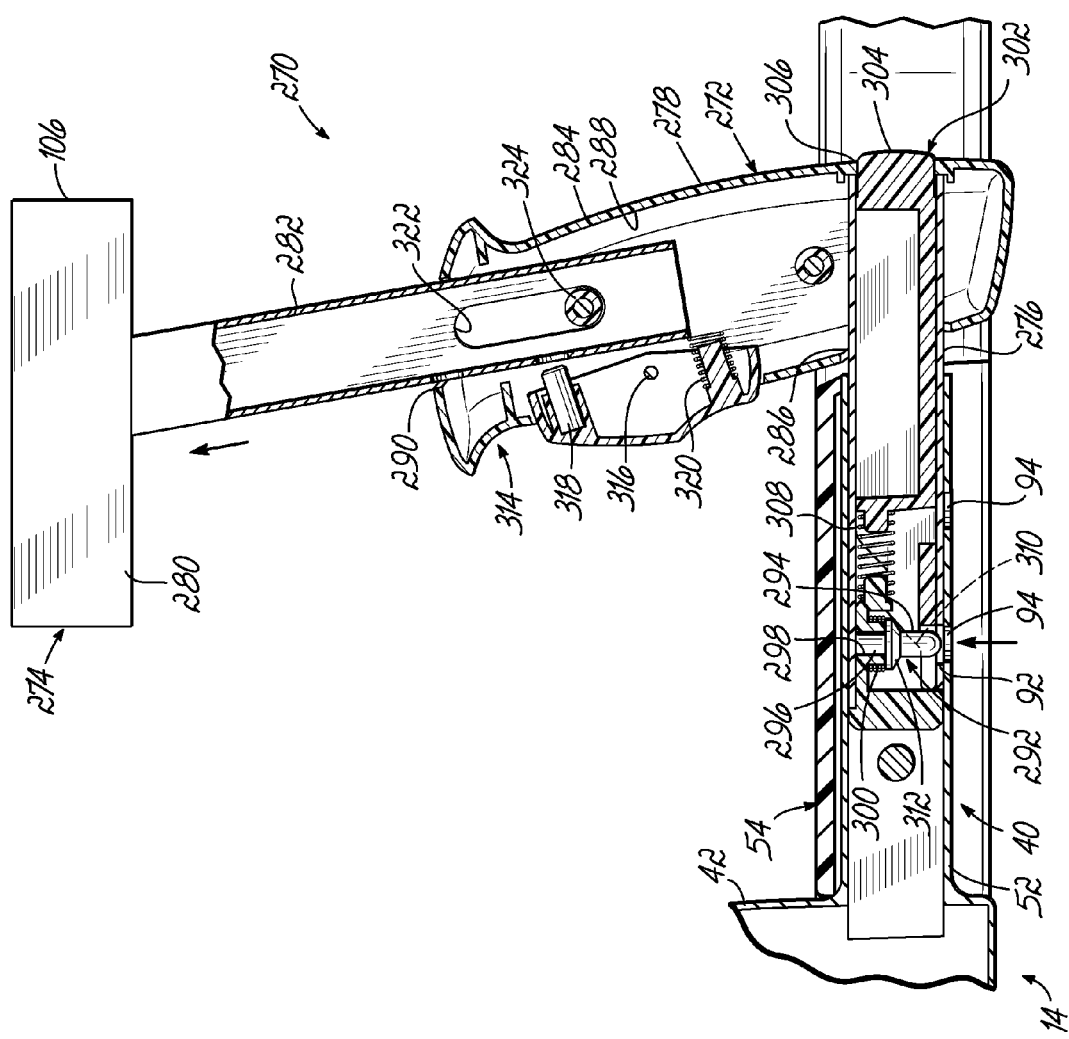
FIG. 9B is another cross-sectional view of the seat assembly shown in FIG. 9A.

FIGS. 9A and 9B show a further embodiment of a seat assembly 270 configured to be removably coupled to the vehicle 10. Similar to the previous embodiment shown in FIGS. 4A and 4B, in this embodiment, the seat assembly 270 may include a generally U-shaped bracket having a lower post 272 and an upper post 274 telescopingly coupled to the lower post. The lower post 272 may be generally L-shaped and include a first leg 276 and a second leg 278 extending therefrom. The upper post 274 may also be generally L-shaped having a first leg 280 and a second leg 282 extending therefrom. The first leg 276 of lower post 272 is configured to couple to the central support post 52 of the rear frame 14 so as to support the seat assembly 270 on vehicle 10. More particularly, an end of the first leg 276 is sized so as to be received within the opening 82 in the free end of the central support post 52 exposed by second cutout 62 of deck 54. As explained in more detail below, the coupling between the first leg 276 of the lower post 272 and the central support post 52 may be achieved through an adjustable push pin locking mechanism.

The second leg 278 of the lower post 272 includes a body 284 configured as a hand grip. The body 284 includes a lower opening 286 configured to receive the first leg 276 therein and secure the first and second legs 276, 278 together. The second leg 278 also includes a passageway 288 and an opening 290 at an upper end thereof configured to receive the second leg 282 of the upper post 274 therein. The first leg 276 of the lower post 272 may be formed from metal or other suitable material. The second leg 278 of the lower post 272 may be formed from plastic, such as through a molding process. The second leg 278 may also be formed from metal or other suitable material and through other processes.

Similar to the previous embodiment, the first leg 280 of the upper post 274 may be configured to couple to a seat (not shown) that supports the rider when the seat assembly 270 is coupled to the vehicle 10 and in a tricycle configuration. A wide variety of seats may be used on the vehicle 10 and the seat may be coupled to the first leg 280 in any conventional manner. The upper post 274 may also include a push bar attachment 106 for coupling an adult push bar (not shown) to propel the vehicle 10, as described above. The second leg 282 of the upper post 274 is configured to be telescopingly received through the opening 290 and within the passageway 288 of the second leg 278 of the lower post 272. The upper post 274 may be formed from metal tubing capable of withstanding the loads placed thereon. Other materials, however, may also be possible including various engineering plastics capable of withstanding the loads on the seat assembly 270. Additionally, and similar to that described above, the lower and upper posts 272, 274 may have non-circular aspects (e.g., square of rectangular aspects) that prevent relative rotation between the various members of the seat assembly 270 and between the seat assembly 270 and the vehicle 10.

Similar to the previous embodiment, the seat assembly 270 may include various locking mechanisms for coupling to the vehicle 10 and provide an adjustment feature to the seat assembly 270. In this regard, the coupling between the first leg 276 of lower post 272 and central support post 52 may be achieved through an adjustable push pin locking mechanisms. As shown in FIGS. 9A and 9B, a push pin 292 may be disposed within first leg 276 adjacent an end thereof and include at least one projection or button 294 and a stem 296 received within a bore 298 of the first leg 276. The push pin 292 includes a spring member 300 that biases the push pin 292 away from the bore 298. As the first leg 276 of lower post 272 slides within the opening 82 of central support post 52, the button 294 is biased slightly inwardly and extends only through an aperture 92 through a wall of the first leg 276. Once the lower post 272 has been sufficiently inserted within the central support post 52, the aperture 92 in first leg 276 is configured to align with an aperture 94 formed through a wall of the central support post 52. When so aligned, the button 294 is unconstrained and springs outwardly due to the bias of spring member 300 to reside within both apertures 92, 94 (FIG. 9A). When the button 294 is disposed through the apertures 92, 94, the seat assembly 270 is secured to the vehicle 10 and telescopic movement of the lower post 272 relative to the central support post 54 is prevented.

In one embodiment, the central support post 52 may include a plurality of apertures 94 configured to receive the button 294 therein. Such a plurality of apertures 94 provide for an adjustment feature of the seat assembly 270 relative to the vehicle 10. Additionally, it should be recognized that to facilitate such an adjustment feature, the push button 294 should be accessible when it extends through both apertures 92, 94 in a locked position. However, unlike the previous embodiment, the seat assembly 270 is configured to allow actuation of the push pin 292 without reaching underneath the deck 54. In this regard, in one embodiment, a push rod 302 is slidably disposed within the first leg 276 and has a push button 304 that extends through an opening 306 on the rear side of the second leg 278. A spring member 308 biases the push rod 302 away from the push pin 292. The push rod 302 includes a ramped surface 310 configured to engage a correspondingly angled surface 312 on the push pin 292.

In operation, when the button 304 of the push rod 302 is pressed inwardly against the bias of spring member 308, the ramped surface 310 of the push rod 302 engages the angled surface 312 on the push pin 292 so as to cause upward movement of the push pin 292 against the bias of spring member 300. The upward movement of the push pin 292 may be sufficient to cause the button 294 to disengage from the aperture 94 in the central support post 52 (FIG. 9B). When the apertures 92, 94 are misaligned, the button 304 may be released such that the push rod 302 moves to its default outward position due to the bias of spring member 308. Alternatively, the push button 304 may be maintained in its inward position during the full movement of the seat assembly 270. With the apertures 92, 94 misaligned, the seat assembly 270 may then be moved in a first direction (e.g., generally horizontal direction) until the button 294 aligns with another aperture 94 in the central support post 52 and springs outwardly, due to the bias of spring member 300, to reside within both apertures 92, 94 and relock the seat assembly 270 to the vehicle 10.

Turning now to the coupling between the lower and upper posts, 272, 274, a push pin locking mechanism may also be used to effectuate adjustability. In this regard, the second leg 278 of the lower post 272 may include an actuator 314 pivotally coupled to the second leg 278 to define a pivot point 316. The actuator 314 includes a pin 318 at one end thereof and on one side of the pivot point 316, and a spring member 320 at the other end thereof an on the opposite side of the pivot point 316. Such a configuration biases the actuator 314 to rotate or pivot in a preferred direction (clockwise as shown in FIGS. 9A and 9B). More particularly, the spring member 320 biases the pin 318 inwardly so as to engage with an aperture 104 formed in the second leg 282 of the upper post 274 that is telescopingly received within the passageway 288 in the lower post 272 (FIG. 9A).

In operation, when the rider or other person applies a force to the actuator 314, the actuator 314 pivots about pivot point 316 so as to disengage the pin 318 from one of the apertures 104 in the second leg 282. When the pin 318 and aperture 104 are misaligned, the button actuator 314 may be released. Alternatively, the actuator 314 may remain pressed during the full movement of the seat assembly 270. With the pin 318 and aperture 104 disengaged, upper post 274 may be moved relative to the lower post 272 in a second direction (e.g., generally vertical direction) until the pin 318 aligns with another aperture 104 in the second leg 282 of the upper post 274 and springs inwardly, due to the bias of spring member 320, to reside within another aperture 104 and relock the relative positions of the lower and upper posts 272, 274. The second leg 282 may include slots 322 configured to receive a pin 324 therethrough which may, for example, limit the travel of the upper post 274 relative to the lower post 272.

Figure 10:
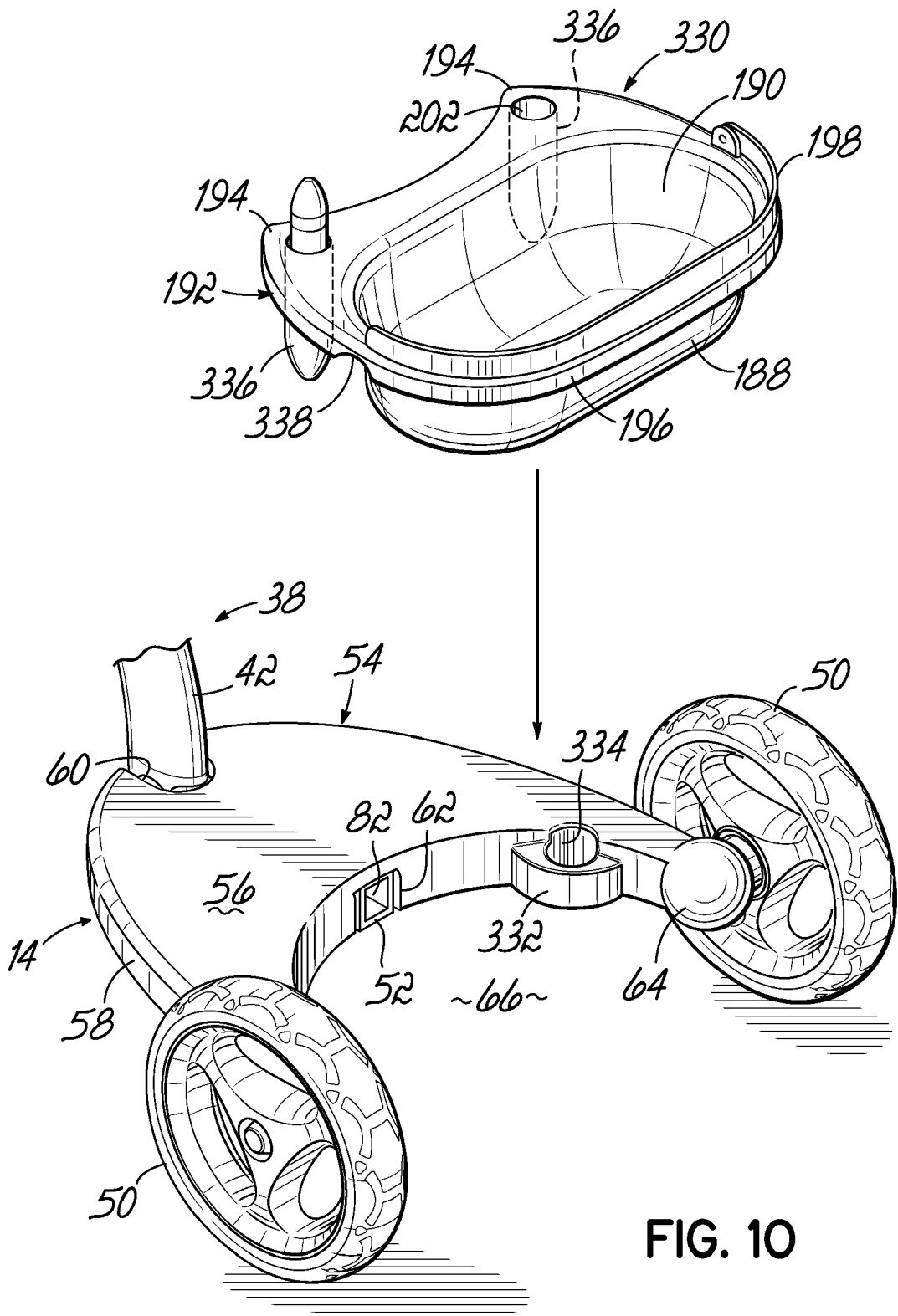
FIG. 10 is a rear perspective view of the child vehicle illustrating an alternate coupling of a bin to the vehicle.

FIG. 10, in which like reference numerals refer to like features in FIGS. 1-8, illustrate an alternative coupling between a bin 330 and the vehicle 10. In this embodiment, the vehicle 10 includes at least one, and preferably a pair of ears 332 formed in the flange 58 of deck 54 and projecting into the opening 66 between rear wheels 50. The ears 332 include a bore 334 formed therethrough configured to receive a portion of the bin 330 so as to couple the bin 330 to the vehicle 10. The bores 334 may be formed completely within ears 334, or partially within ears 334 and partially within the deck 54.

As mentioned above, the bores 334 in the deck 54 are configured to receive a portion of the bin 330 therein. In this regard, the bin 330 includes a pin or post 336 projecting from the underside of the flange 194. More particularly, the posts 336 may project from the underside of the ears 194 formed in the flange 194 of bin 330. The posts 336 may include a blind bore 202 open along the top of flange 58 configured to receive, for example, one or more writing utensils therein. The bin 330 may be coupled to the vehicle 10 by placing the bin 330 overtop the deck 54 such that the posts 336 align with the bores 334 in the ears 332. The bin 330 may then be lowered such that the posts extend within or through the bores 334 and thereby secure the bin 330 to the vehicle. The bin 330 may be removed from the vehicle 10 by lifting the bin 330 upwardly such that the posts 336 disengage the bores 334. The bin 330 may then be moved to a location desired by the child for playing. In this embodiment, the channels 200 through lobes 64 may be omitted. Instead, the flange 58 of bin 330 may include a cutout 338 that receives a part of lobe 64 to support the bin 330 thereon.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. For example, in describing the tool-less coupling between the front and rear frames, the post and locking insert were associated with the front frame and the head tube was associated with the rear frame. It should be realized, however, that associating the post and locking insert with the rear frame and associating the head tube with the front frame is within the scope of the present invention. Thus, the various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A tool-less coupling of a child vehicle having a front frame and a rear frame, comprising:

a post coupled to one of the front frame or rear frame, the post having an outer surface and a free end;

a locking insert having at least one generally flexible tab coupled to the free end of the post such that at least a portion of the at least one flexible tab extends generally outwardly of the outer surface of the post, the at least one flexible tab capable of flexing generally inwardly toward the outer surface of the post; and a head tube coupled to the other of the front frame or rear frame, the head tube including a passageway configured to receive the post therein and a first end having an opening in communication with the passageway and an end surface disposed about the opening, wherein the opening in the first end is sized to cause inward flexing of the at least one flexible tab as the post is inserted through the passageway, and the at least one flexible tab flexes back outwardly after passing through the opening in the first end so that a portion of the at least one flexible tab is adjacent the end surface such that the flexible tab cannot move back through the opening and removal of the post from the head tube is prohibited, thereby coupling the front and rear frames together in a tool-less manner.

2. The tool-less coupling of claim 1, wherein the post includes a passageway therethrough and at least one slot formed through the outer surface of the post so as to be in communication with the passageway, at least a portion of the locking insert positioned in the passageway when coupled to the post such that at least a portion of the at least one tab projects through the at least one slot.

3. The tool-less coupling of claim 1, further comprising a protective cap configured to cover the locking insert.

4. The tool-less coupling of claim 1, wherein the front frame includes a fork which generally defines a fork axis, the coupling between the front and rear frames defining a pivot axis that is offset from the fork axis.

5. The tool-less coupling of claim 4, wherein the front frame includes a pair of legs that generally define a leg plane, the coupling further comprising a crossbar extending between the legs so as to project out of the leg plane, one of the head tube or post being coupled to a portion of the crossbar outside of the leg plane.

6. The tool-less coupling of claim 3, the locking insert further comprising a button positioned at an upper end thereof, wherein when the button is passed through a passageway of the protective cap the button biases at least one flexible locking tab of the protective cap outwardly so as to secure the protective cap to the locking insert.

7. The tool-less coupling of claim 5, wherein the pair of legs extends substantially the full length of the fork.

8. The tool-less coupling of claim 1, wherein the child vehicle is selected from the group consisting of a tricycle, a bicycle, or a scooter.

9. A tool-less assembly method for a child vehicle having a front frame and a rear frame defining a coupling, the coupling comprising a post having a locking insert with at least one flexible tab coupled to one of the front frame or rear frame, and a head tube coupled to the other of the front frame or rear frame having a passageway and an end with an opening and an end surface, the tool-less assembly method comprising:
    inserting the post into the passageway of the head tube;
    flexing the at least one flexible tab as the locking insert passes through the first end of the head tube; and
    positioning the flexible tab adjacent the end surface of the first end and outwardly of the opening therein after passing the locking insert through the first end so as to couple the front frame to the rear frame.

10. The method of claim 9, wherein the post includes at least one aperture and the locking insert includes at least one aperture generally corresponding in shape and position to the at least one aperture of the post, the method further comprising:
    aligning the at least one aperture of the locking insert with the at least one aperture of the post; and
    inserting a fastener through the aligned apertures, so as to secure the locking insert to the post.

11. The method of claim 9, wherein a protective cap covers the at least one flexible tab of the locking insert.

12. The method of claim 11, the method further comprising:
    aligning the protective cap with the locking insert; and
    securing the protective cap on the locking insert;
    wherein the at least one flexible tab of the locking insert is inaccessible when the protective cap is coupled to the locking insert.

13. The method of claim 12, the protective cap including a passageway therethrough and at least one flexible locking tab, and the locking insert including a button positioned at an upper end thereof, the method further comprising:
    passing the button of the locking insert through the passageway of the protective cap so as to bias the at least one flexible locking tab of the protective cap outwardly and expose the button at an upper edge of the passageway of the protective cap.

14. The tool-less coupling of a seat assembly to a child vehicle having a rear frame, comprising:
    a central support post coupled to the rear frame, the central support post having a free end;
    a lower post having a first leg and a second leg angled with respect to the first leg, the first leg being sized so as to be telescopingly coupled to the free end of the central support post;
    a push pin locking mechanism for securing the first leg of the lower post to the central support post;
    an upper post having a first leg and a second leg angled with respect to the first leg, the upper post being telescopingly coupled to the lower post; and
    a seat coupled to the first leg of the upper post.

15. The tool-less coupling of claim 14, the push pin locking mechanism further comprising a push pin disposed within the first leg of the lower post, the push pin comprising:
    a generally U-shaped spring member having two ends; and
    a projection coupled to an end of the spring member; and
    the central support post further comprising at least one aperture configured to receive the projection therein;
    wherein the spring member is configured to bias the ends in an outward direction away from each other;
    wherein when the first leg of the lower post is telescoped into the free end of the central support post, the projection is biased slightly inwardly and extends only through an aperture through a wall of the first leg corresponding to the at least one aperture of the central support post.

16. The tool-less coupling of claim 15, the central support post further comprising a plurality of apertures configured to receive the projection therein, wherein the plurality of apertures provides an adjustment feature of the seat relative to the vehicle in a first direction.

17. The tool-less coupling of claim 14, further comprising:
    a plurality of apertures through a wall of the second leg of the lower post or the second leg of the upper post;
    at least one aperture through a wall of the other of the second leg of the lower post or the second leg of the upper post; and
    a second push pin locking mechanism located in the second leg of the lower post or the second leg of the upper post;
    wherein the plurality of apertures provides an adjustment feature of the seat relative to the central post of the vehicle in a second direction.

18. The tool-less coupling of claim 14, wherein the first and second legs of the upper post have non-circular aspects.

19. The tool-less coupling of claim 18, wherein the first and second legs of the upper post have square or rectangular aspects.

* * * * *